US012772935B2

(12) United States Patent
Li et al.

(10) Patent No.: US 12,772,935 B2
(45) Date of Patent: Oct. 27, 2026

(54) POWER DEVICE AND POWER TOOL

(71) Applicant: Greenworks (Jiangsu) Co., Ltd., Changzhou (CN)

(72) Inventors: Jianbo Li, Changzhou (CN); Lingao Zhang, Changzhou (CN); Xiaohui Huo, Changzhou (CN); Yongxing Ma, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 424 days.

(21) Appl. No.: 18/507,082

(22) Filed: Nov. 12, 2023

(65) Prior Publication Data

US 2024/0074359 A1 Mar. 7, 2024

Related U.S. Application Data

(63) Continuation of application No. PCT/CN2022/093993, filed on May 19, 2022.

(30) Foreign Application Priority Data

| | | |
|---|---|---|
| May 20, 2021 | (CN) | 202121082571.6 |
| Jul. 6, 2021 | (CN) | 202110760355.0 |
| Oct. 20, 2021 | (CN) | 202122528663.9 |
| Dec. 30, 2021 | (CN) | 202111655519.X |
| Dec. 30, 2021 | (CN) | 202123440246.5 |

(51) Int. Cl.

*A01G 3/053* (2006.01)
*B25F 5/00* (2006.01)

(52) U.S. Cl.

CPC .............. *A01G 3/053* (2013.01); *B25F 5/001* (2013.01)

(58) Field of Classification Search

CPC ............ A01G 3/053; A01G 3/06; B25F 5/001

See application file for complete search history.

(56) References Cited

U.S. PATENT DOCUMENTS

| | | | | |
|---|---|---|---|---|
| 4,905,423 A * | 3/1990 | van Laere | B25F 5/001 | 81/464 |
| 7,320,384 B2 * | 1/2008 | Huang | F16H 57/0434 | 184/11.1 |
| 8,421,608 B2 * | 4/2013 | Lerner | G06F 3/016 | 340/407.1 |
| 2007/0108944 A1 | 5/2007 | Pellenc | | |
| 2009/0241350 A1 | 10/2009 | Lau | | |

(Continued)

FOREIGN PATENT DOCUMENTS

| | | |
|---|---|---|
| CN | 102231947 A | 11/2011 |
| CN | 202695223 U | 1/2013 |

(Continued)

*Primary Examiner* — Omar Flores Sanchez

(57) ABSTRACT

A power device and a power tool are provided, including a motor and a transmission gear set. The transmission gear set includes a driving gear and a driven gear, a speed of the motor is from 5000 rpm to 11000 rpm, a diameter is from 20 mm to 50 mm, and a volume is from 600 $mm^3$ to 2200 $mm^3$. A weight is from 90 g to 260 g. A reduction ratio of the driving gear to the driven gear is from 2 to 7. The power tool of the disclosure adopts an outer rotor motor with a smaller rotor diameter and a lower rotating speed, which reduces a volume and weight of the overall device, is easy to mount and carry, and increases a battery life.

18 Claims, 17 Drawing Sheets

(56) References Cited

U.S. PATENT DOCUMENTS

| | | | | |
|---|---|---|---|---|
| 2010/0101096 | A1* | 4/2010 | Yamaoka | A01G 3/053 30/199 |
| 2011/0203118 | A1* | 8/2011 | Saito | A01D 34/902 30/276 |
| 2012/0017447 | A1* | 1/2012 | Nie | A01G 3/053 30/277.4 |
| 2013/0192432 | A1* | 8/2013 | Barker | B26B 19/36 83/13 |
| 2015/0209947 | A1* | 7/2015 | Mandel | F16H 3/003 474/69 |
| 2017/0303474 | A1* | 10/2017 | Sheffer | A01G 3/053 |
| 2018/0328349 | A1* | 11/2018 | Wu | F04B 1/16 |
| 2020/0396906 | A1* | 12/2020 | Li | F02B 63/02 |
| 2025/0212733 | A1* | 7/2025 | Li | A01G 3/053 |
| 2025/0374865 | A1* | 12/2025 | Reichle | A01G 3/053 |
| 2025/0381656 | A1* | 12/2025 | Yamaguchi | B25F 5/008 |
| 2026/0021550 | A1* | 1/2026 | Ji | B24B 27/08 |

FOREIGN PATENT DOCUMENTS

| | | | |
|---|---|---|---|
| CN | 103170953 | A | 6/2013 |
| CN | 104816273 | A | 8/2015 |
| CN | 105328646 | A | 2/2016 |
| CN | 105978055 | A | 9/2016 |
| CN | 106253286 | A | 12/2016 |
| CN | 205884090 | U | 1/2017 |
| CN | 205884091 | U | 1/2017 |
| CN | 207251228 | U | 4/2018 |
| CN | 107979254 | A | 5/2018 |
| CN | 110810044 | A | 2/2020 |
| CN | 110810045 | A | 2/2020 |
| CN | 210120175 | U | 2/2020 |
| CN | 211020135 | U | 7/2020 |
| CN | 211507440 | U | 9/2020 |
| CN | 212113502 | U | 12/2020 |
| CN | 212516969 | U | 2/2021 |
| CN | 212750655 | U | 3/2021 |
| CN | 113366988 | A | 9/2021 |
| CN | 215935640 | U | 3/2022 |
| CN | 114303679 | A | 4/2022 |
| EP | 3669640 | A1 | 6/2020 |
| EP | 3753396 | A1 | 12/2020 |
| JP | 2001239474 | A | 9/2001 |
| JP | 2006141213 | A | 6/2006 |
| KR | 20110073787 | A | 6/2011 |
| WO | 2018010699 | A1 | 1/2018 |

* cited by examiner

POWER DEVICE AND POWER TOOL

CROSS REFERENCE TO RELATED APPLICATION

The present application is a continuation Application of PCT application No. PCT/CN2022/093993 filed on May 19, 2022, which claims the benefit of CN202121082571.6 filed on May 20, 2021, CN202110760355.0 filed on Jul. 6, 2021, CN202122528663.9 filed on Oct. 20, 2021, CN202111655519.X filed on Dec. 30, 2021, CN202123440246.5 filed on Dec. 30, 2021. All the above are hereby incorporated by reference.

TECHNICAL FIELD

The disclosure relates to a technical field of garden tools, in particular to a power device and power tool.

BACKGROUND

Power tools are one of the important equipment for garden maintenance. They are mainly used to trim the branches and leaves of shrubs to make them look regular. In order to perform routine garden trimming tasks, users must hold the handle of the power tool and cut above eye level, which may be very tiring to maintain the holding position of the power tool. However, the conventional power tools on the market have large volume and weight, and the whole machine is heavy, thus causing the operator to be easily fatigued. At the same time, the power consumption of power tools is large, and the battery pack has a short duration life.

SUMMARY

The disclosure provides a power device and a power tool for solving a problem of excessive power consumption of a power tool in the conventional art.

The disclosure provides a power device. The power device includes a motor and a transmission gear set. The transmission gear set is connected with the motor in transmission and includes a driving gear and a driven gear. The driving gear is fixed to an output shaft of the motor. The driven gear meshes with the driving gear. Wherein, a speed of the motor is from 5000 rpm to 11000 rpm, a diameter of the motor is from 20 mm to 50 mm, and a volume of the motor is from 600 $mm^3$ to 2200 $mm^3$, a weight of the motor is from 90 g to 260 g, and a reduction ratio of the driving gear to the driven gear is from 2 to 7.

In some embodiments, the motor is an outer rotor motor, a rotating speed of the motor is 10000 rpm, and the diameter of the motor is from 35 mm to 40 mm.

In some embodiments, the reduction ratio of the driving gear and the driven gear is 5.

In some embodiments, a product value of the weight of the motor and a current is in a range of 54 g*A to 1040 g*A, and a product value of the volume of the motor and the current is in a range of 360 $mm^3$*A to 8800 $mm^3$*A.

In some embodiments, the transmission gear set further includes an eccentric block and a crank connecting rod. The eccentric block is fixed on the driven gear, a center of the eccentric block is misaligned with a center of the driven gear, and the eccentric block is connected with a working assembly of a power tool in a transmission. A first end of the crank connecting rod is rotatably connected with the eccentric block, and a second end of the crank connecting rod is rotatably connected with the working assembly of the power tool, and is configured to drive a blade of the power tool to reciprocate.

In some embodiments, at least two eccentric blocks are arranged on the driven gear, which are respectively located on two sides of the driven gear, and arranged symmetrically along the center of the driven gear.

The disclosure further provides a power tool. The power tool includes a power tool body and a power device. The power device is arranged in the power tool body and includes the motor and the transmission gear set. The transmission gear set is connected with the motor in transmission and includes a driving gear and a driven gear. The driving gear is fixed to an output shaft of the motor. The driven gear meshes with the driving gear. Wherein, a speed of the motor is from 5000 rpm to 11000 rpm, a diameter of the motor is from 20 mm to 50 mm, and a volume of the motor is from 600 $mm^3$ to 2200 $mm^3$, a weight of the motor is from 90 g to 260 g, and a reduction ratio of the driving gear to the driven gear is from 2 to 7.

In some embodiments, the power tool body includes a housing, a transmission gearbox, a working assembly and a control component. The housing is hollowed out in a middle and provided with a handle. The transmission gearbox is arranged at a bottom of the housing and configured to mount the transmission gear set. The working assembly is connected with the transmission gear set in a transmission. The control component is mounted in the housing and configured to control a start and stop of the motor.

In some embodiments, the working assembly includes an upper blade, a lower blade and a supporting arm. The upper blade partially extends into the transmission gearbox and is rotatably connected with a crank connecting rod, and the upper blade located outside the transmission gearbox is provided with a saw tooth. The lower blade partially protrudes into the transmission gearbox, is rotatably connected with the crank connecting rod and provided with a same structure as the upper blade, and a saw tooth on the lower blade and the saw tooth on the upper blade are misaligned. The supporting arm partially extends into the gear transmission box and is fixedly connected with the upper blade and the lower blade by bolts.

In some embodiments, the control component includes a micro switch and a switch trigger. The micro switch is mounted in the housing and located near the handle of by the housing. The switch trigger is rotatably connected with the handle, and includes a connecting shaft, a contacting end, an elastic component, a locking trigger and a control panel. The contacting end corresponds to a contacting point of the micro switch. The elastic component abuts between the switch trigger and the inner wall of the housing. The locking trigger is slidably connected with the housing, slides along an axis of the connecting shaft, and is configured to lock the switch trigger. The control panel is located in the housing and on a side away from the working assembly, electrically connected with the micro switch and the motor, and controlling the start and stop of the motor.

In some embodiments, an end of the housing away from the working assembly is provided with a power port, and the power port is connected with a power supply device through a power cable.

In some embodiments, the power supply device includes a bag body, a backpack and a power supply unit. The backpack is connected with the bag body and configured to wear and carry the bag body for the user. The power supply unit is arranged inside the bag body. The power cable is electrically connected with the power supply unit and extends outside the bag body. At least part of the power cable is a retractable power cable. The power cable extends from two sides of the bag body to supply power to an outside.

In some embodiments, two opposite sides of the bag body are provided with a through hole for the power cable to pass through.

In some embodiments, the backpack includes a backpack strap and a backpack belt. The backpack strap is connected with an upper end of the bag body and connected by a buckle. The backpack belt is connected with a lower end of the bag body and connected by the buckle.

In some embodiments, the backpack strap includes a left backpack strap and a right backpack strap, and the left backpack strap and the right backpack strap are respectively connected with two sides of a top of the bag body.

In some embodiments, both the left backpack strap and the right backpack strap are horizontally connected with a fixing strap, and the two fixing straps are connected by a buckle.

In some embodiments, the power supply unit includes a battery pack and a mounting base. The mounting base is arranged in the bag body and configured to detachably mount the battery pack.

In some embodiments, a signal line is arranged passed through the power cable.

In some embodiments, the power cable includes a joint end, and is electrically connected with a power port through the joint end.

As mentioned above, the power device and power tool provided in this disclosure may greatly reduce a volume and weight of the whole device, which enables it to be easy to mount and carry. In addition, a lower rotating speed and transmission ratio may reduce energy consumption, thereby increasing a duration life of a battery and increasing a battery life of the device. Through arranging through holes on two opposite sides of the bag body and passing through the power cable in the through holes, it is convenient for a user to make an adaptive choice, and an optionality and convenience of pulling out the power cable in a backpack power supply device are improved.

PART NUMBER DESCRIPTION

10—power device; 11—motor; 111—supporting plate; 112—fan blade; 12—transmission gear set; 121—driving gear; 122—driven gear; 1221—eccentric block; 1222—rotating shaft; 1223—placement groove; 13—crank connecting rod; 131—first connecting hole; 132—second connecting hole; 133—limiting plate; 14—first bearing; 15—second bearing;

20—housing; 21—handle; 22—protection shield; 23—rib board; 24—air inlet; 25—air outlet; 26—clamping groove; 27—resisting plate; 28—blocking plate; 29—transmission gearbox; 291—upper housing; 292—lower housing;

30—working assembly; 31—upper blade; 32—lower blade; 33—supporting arm; 331—fixing bolt; 332—gasket; 333—fixing nut; 34—clamping block; 35—first slotted hole; 36—second slotted hole; 37—fixing plate; 38—pressing plate;

40—switch assembly; 41—micro switch; 411—contacting point; 42—switch trigger; 421—connecting shaft; 422—contacting end; 423—groove; 424—abutting plate; 425—cross block; 426—first spring; 43—locking trigger; 431—locking plate; 432—sliding shaft; 433—mounting groove; 434—second spring; 44—control panel;

50—power port; 51—notch; 52—positive and negative columns; 53—signal line; 54—positioning protrusion; 55—clamping blocking plate;

60—bag body; 61—carrying handle; 62—through hole;

70—backpack; 71—left backpack strap; 72—right backpack strap; 73—backpack belt; 74—connecting belt; 75—fixing belt;

80—mounting base; 81—inserting base; 82—positioning plate; 83—plugging terminal;

90—battery pack; 91—mounting housing; 92—power supply terminal; 93—inserting groove;

100—power cable; 101—spring cable; 102—joint end; 103—positive and negative terminals; 104—signal terminal; 105—clamping plate; 106—embedding groove.

DETAILED DESCRIPTION

The following describes the implementation of the disclosure through specific embodiments, and those skilled in the art may easily understand other advantages and effects of the disclosure from the content disclosed in this specification. The disclosure may also be implemented or applied through other different specific embodiments. Various details in this specification may also be modified or changed based on different viewpoints and applications without departing from the disclosure.

Figure 1:
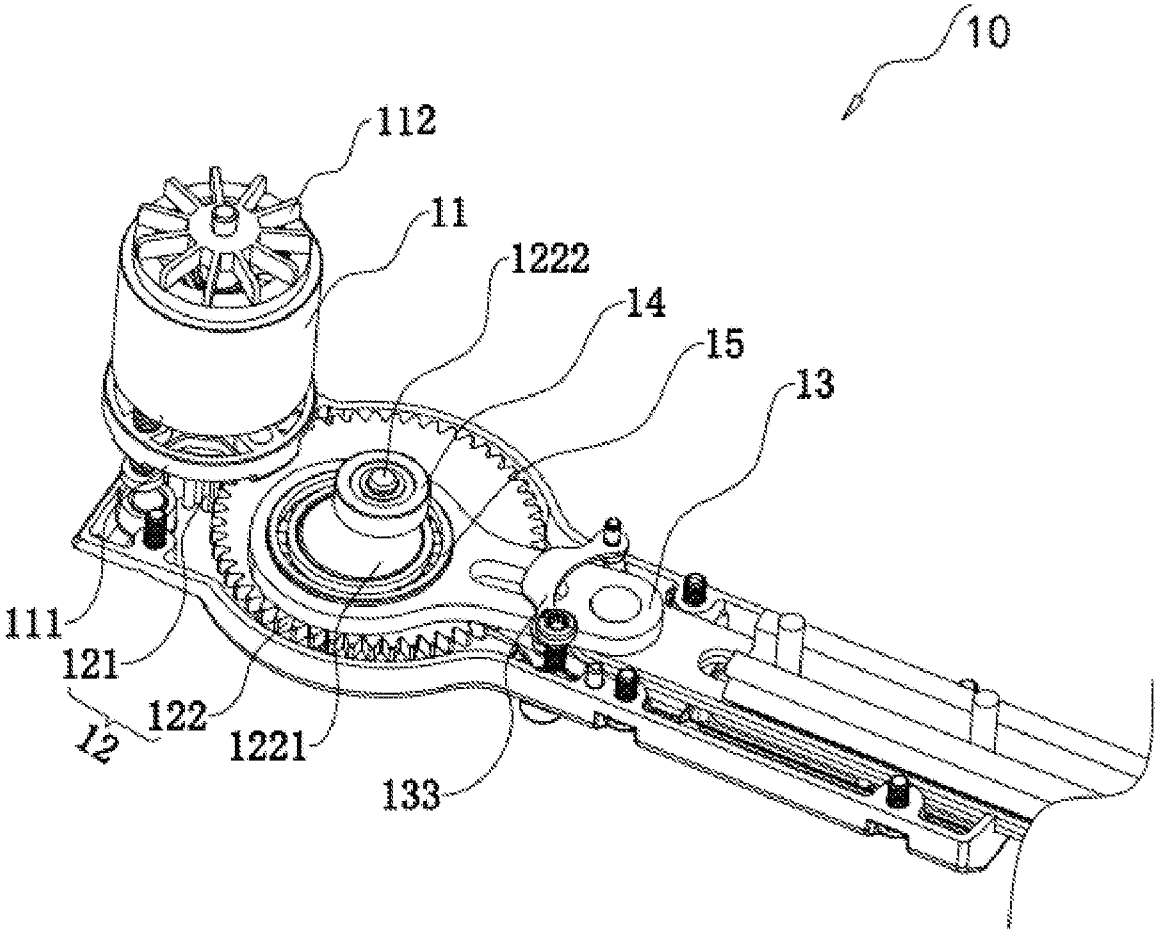
FIG. 1 is an axonometric view of a power device in a power tool in the disclosure.

Please refer to FIG. 1. The disclosure provides a power tool, which may include various types of power tools, such as but not limited to hedge trimmers, blowers, chain saws, string trimmers and the like.

Please refer to FIG. 1. In some embodiments, the power tool in this embodiment may include a power device 10, and the power device 10 may include a motor 11, a transmission gear set 12 and a working assembly 30. Wherein, the motor 11 may be mounted inside a housing of the power tool, and may be used to provide power output to the transmission gear set 12. The transmission gear set 12 may be mounted at a bottom of the housing of the power tool, and the transmission gear set 12 may be connected with the motor 11 in transmission, and the transmission gear set 12 may be used to drive the working assembly 30 of the power tool to slide back and forth. The working assembly 30 may be connected in transmission with the transmission gear set 12. It may be understood that, in this embodiment, the working assembly 30 may be a blade assembly. When the motor 11 is working, it may drive the transmission gear set 12 to rotate, and the transmission gear set 12 may drive the working assembly 30 for reciprocating sliding, so that the working assembly 30 may work.

Figure 2:
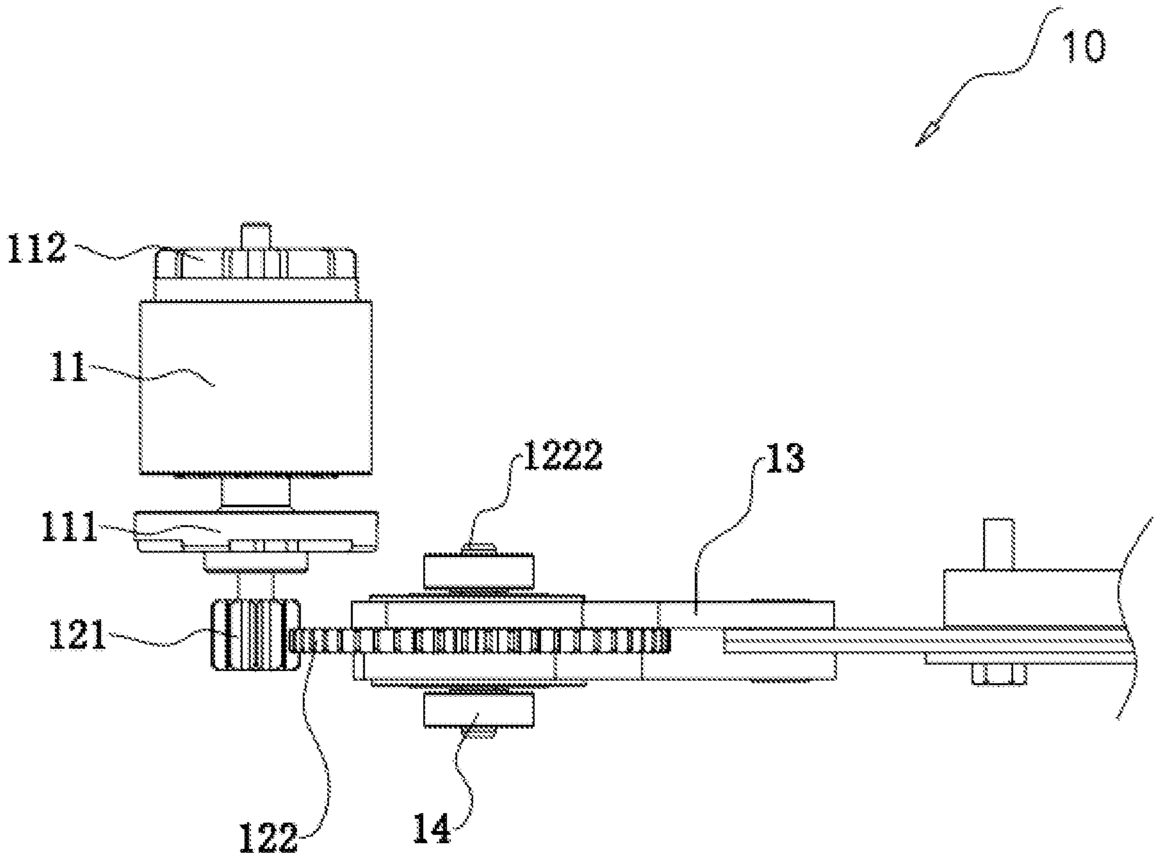
FIG. 2 is a front view of the power device in the power tool in the disclosure.

Please refer to FIG. 1 and FIG. 2. In some embodiments, the motor 11 may be an outer rotor motor 11, and an output shaft of the motor 11 may be arranged vertically, and may be arranged perpendicularly to the working assembly 30 of the power tool. One end of the motor 11 close to the transmission gear set 12 may be sleeved with a bearing, an inner ring of the bearing may be fixedly connected with the output shaft of the motor 11, and an outer ring may be fixedly connected with a supporting plate 111. The supporting plate 111 may be connected with a bottom wall of a bearing housing in the motor 11, and may be fixedly connected with the housing of the power tool through bolts.

Please refer to FIG. 1 and FIG. 2. In some embodiments, a rotating speed of the motor 11 may be from 5000 rpm to 11000 rpm, and in an embodiment of the disclosure, the rotating speed of the motor 11 is 10000 rpm. A diameter of a rotor of the motor 11 may be from 20 mm to 50 mm, and in an embodiment of the disclosure, the diameter of the rotor of the motor 11 may be from 35 mm to 40 mm. In some other embodiments, the diameter of the rotor of the motor 11 may also be from 20 mm to 40 mm. The motor 11 may be the outer rotor motor 11, and an inertia generated by a rotation of the outer rotor may be used to provide power output. A weight of the outer rotor motor 11 may be from 90 g to 260 g, and a current of the outer rotor motor 11 may be from 0.6 A to 4 A. Wherein, a volume of the outer rotor motor 11 may be from 600 $mm^3$ to 2200 $mm^3$, a product value of the weight of the outer rotor motor 11 and the current may be in a range of 54 g*A to 1040 g*A, and a product value of the volume of the outer rotor motor 11 and the current may be in a range of 360 $mm^3$*A to 8800 $mm^3$*A. A use of a motor with a smaller rotor diameter and a lower rotating speed greatly reduces a volume and weight of the whole machine, which enables it to be easy to mount and carry.

Please refer to FIG. 1 and FIG. 2. In some embodiments, the transmission gear set 12 may include a driving gear 121 and a driven gear 122. An output shaft of the driving gear 121 and the motor 11 may be coaxially fixed, the driven gear 122 is rotatably connected in the housing of the power tool, and may mesh with the driving gear 121, and a center of the driving gear 121 and a center of the driven gear 122 may be located on a same horizontal line. A reduction ratio between the driving gear 121 to the driven gear 122 is from 2 to 7. In an embodiment of the disclosure, the reduction ratio of the driving gear 121 to the driven gear 122 may be five. A lower transmission ratio may achieve lower energy consumption, thereby increasing a duration life of a battery, prolonging a battery life of the whole machine, and improving an operator's sense of use.

Figure 3:
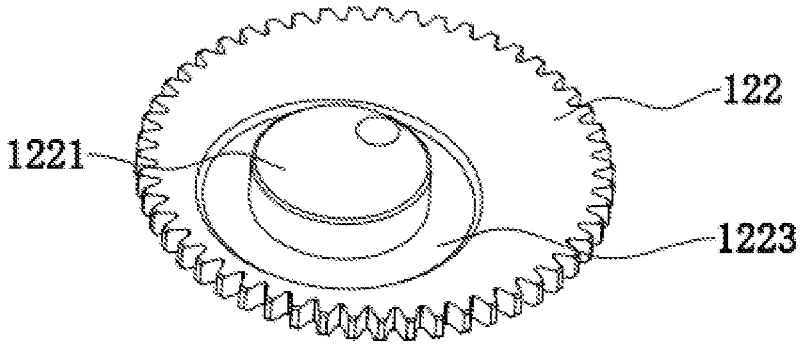
FIG. 3 is an axonometric view of a driven gear of the power tool in the disclosure.
Figure 4:
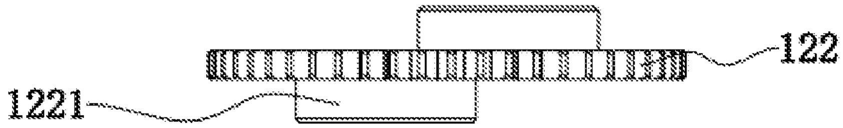
FIG. 4 is a front view of the driven gear of the power tool in the disclosure.

Please refer to FIG. 3 and FIG. 4. In some embodiments, the transmission gear set 12 may further include an eccentric block 1221, the eccentric block 1221 may be fixed on the driven gear 122, and may be in a shape of a round block. A center of the eccentric block and a center of the driven gear 122 may be misaligned, and the eccentric block may be connected with a blade of the power tool in transmission. For example, at least two eccentric blocks 1221 may be arranged on the driven gear 122, respectively located on two surfaces of the driven gear 122, and arranged in a centrosymmetric way with respect to the center of the driven gear 122.

Please refer to FIG. 2 and FIG. 3. In some embodiments, the center of the driven gear 122 may be vertically penetrated with a rotating shaft 1222, and the rotating shaft 1222 may pass through the eccentric block 1221 and the driven gear 122 sequentially from top to bottom. Both ends of the rotating shaft 1222 may be coaxially fixed with a first bearing 14, the first bearing 14 may be fixedly connected with the housing of the power tool, and a gap may be left between the first bearing 14 and the eccentric block 1221. The driven gear 122 may be connected with the housing of the power tool through the first bearing 14, which may avoid generating large friction force and increase a smoothness of rotation.

Figure 5:
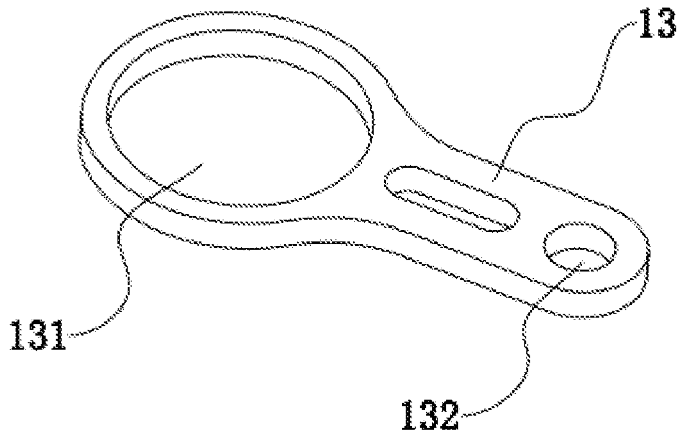
FIG. 5 is a schematic structural view of a crank connecting rod of the power tool in the disclosure.

Please refer to FIG. 1, FIG. 2 and FIG. 5. In some embodiments, the transmission gear set 12 may further include a crank connecting rod 13. Two ends of the crank connecting rod 13 may be provided with a first connecting hole 131 and a second connecting hole 132 respectively. The first connecting hole 131 may be embedded with the eccentric block 1221, and the second connecting hole 132 may be rotatably connected with a protrusion on the blade of the power tool, so as to drive the blade to reciprocate and slide.

Please refer to FIG. 1, FIG. 2 and FIG. 5. In some embodiments, a second bearing 15 may be mounted between the first connecting hole 131 and the eccentric block 1221, and the crank connecting rod 13 may be fitted with the eccentric block 1221 through the second bearing 15. The driven gear 122 may be provided with a placement groove 1223 on a periphery of the eccentric block 1221, which may be used to place the second bearing 15. The placement groove 1223 may be coupled with the second bearing 15. For example, when there are two eccentric blocks 1221 on the driven gear 122, the crank connecting rods 13 may also be two, the first connecting holes 131 may be respectively embedded with the corresponding eccentric blocks 1221, and the second connecting holes 132 may be respectively rotatably connected with an upper blade 31 and a lower blade 32 of the working assembly 30 of the power tool.

Please refer to FIG. 1. In some embodiments, in actual use, the output shaft of the motor 11 may be rotated by starting the motor 11, thereby driving the driving gear 121 to rotate, and then the driven gear 122 meshed with the driving gear 121 may be rotated. The crank connecting rod 13 may form a crank rocker mechanism through the eccentric block 1221 and the driven gear 122, the eccentric block 1221 may rotate along with the driven gear 122, and may drive a first end of the crank connecting rod 13 which is at the first connecting hole 131 to perform a circular motion, and a second end of the crank connecting rod 13 may perform a reciprocating sliding movement, so as to drive the working assembly 30 to reciprocate and slide.

Figure 6:
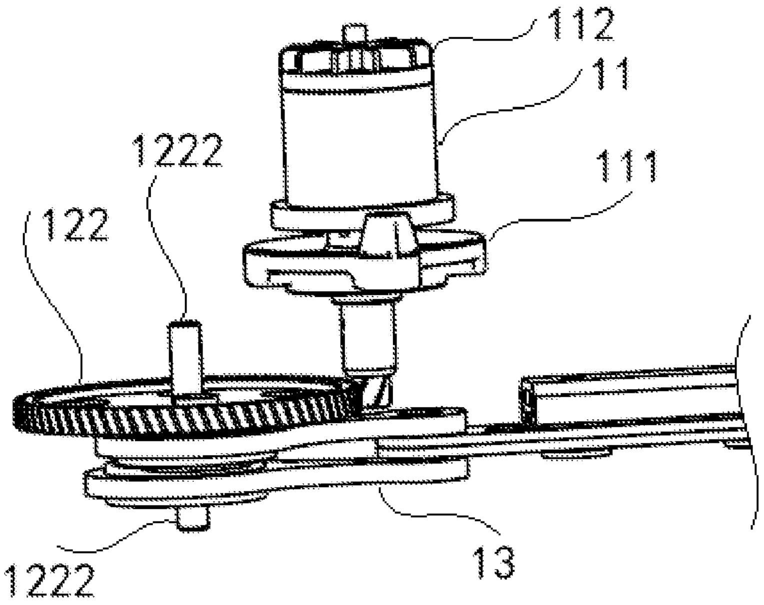
FIG. 6 is a schematic structural view of the power device in the power tool in the disclosure.
Figure 7:
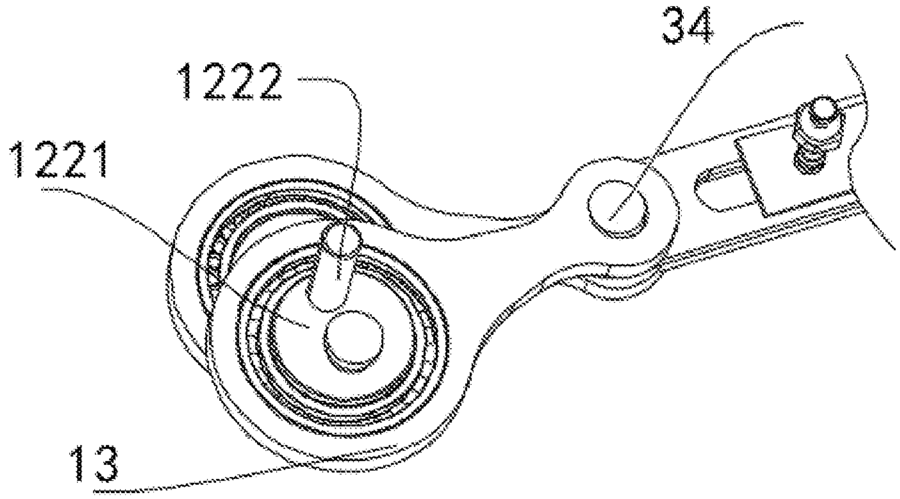
FIG. 7 is a schematic connection view of the crank connecting rod of the power tool in the disclosure.
Figure 8:
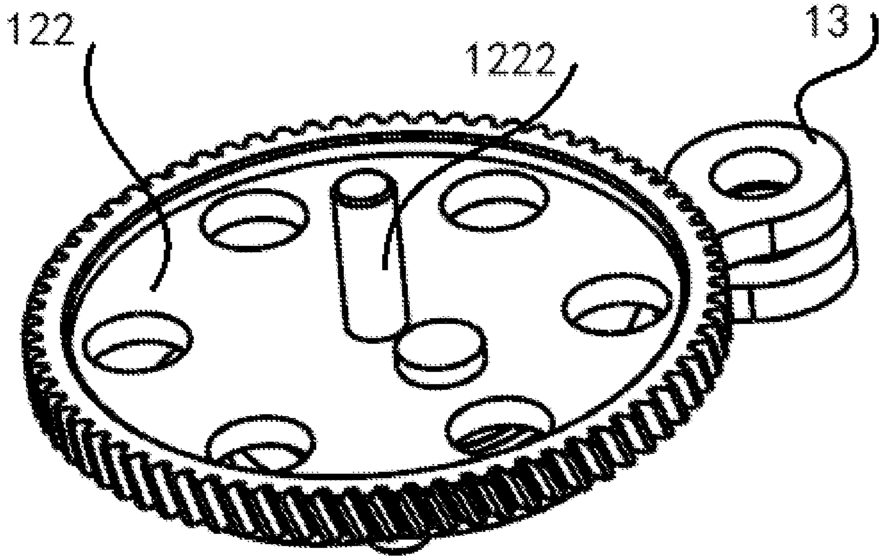
FIG. 8 is a schematic connection view of the driven gear of the power tool in the disclosure.

Please refer to FIG. 6, FIG. 7 and FIG. 8. In some embodiments, an output end of the motor 11 may be connected with a driving gear 121, and the driving gear 121 may be meshed with the driven gear 122. The driven gear 122 may be fixedly connected with the rotating shaft 1222, the rotating shaft 1222 may pass through the driven gear 122, and the rotating shaft 1222 may be located at the center of the driven gear 122. An outer wall of the rotating shaft 1222 may be fixedly connected with the eccentric block 1221, the rotating shaft 1222 may pass through the eccentric block 1221, and the rotating shaft 1222 may be located at a non-center position of the eccentric block 1221. A number of eccentric blocks 1221 may be two, the two eccentric blocks 1221 may be arranged symmetrically with respect to an axis of the rotating shaft 1222, and the two eccentric blocks 1221 may be located on a same side of the driven gear 122.

Figure 9:
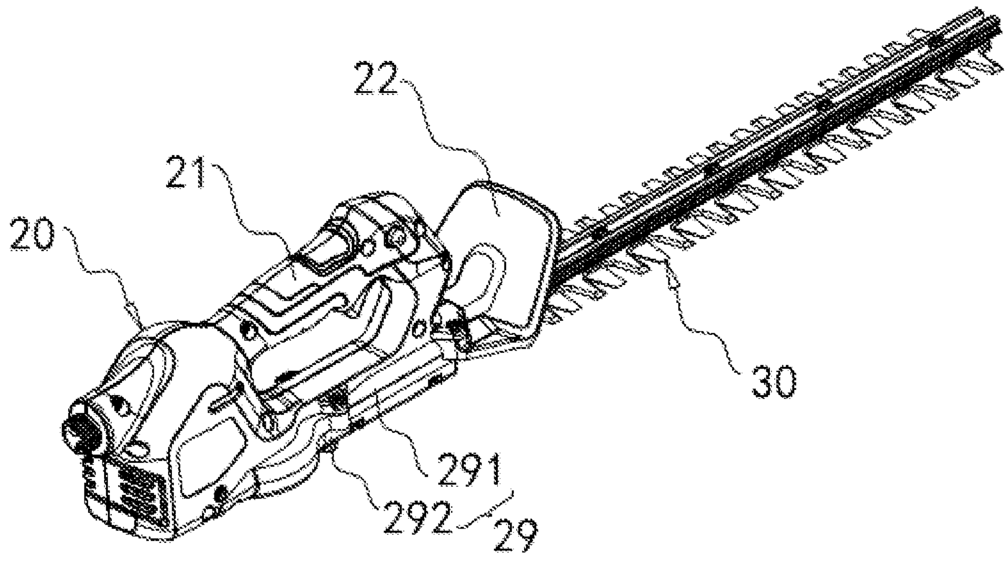
FIG. 9 is an axonometric view of the power tool in the disclosure.
Figure 10:
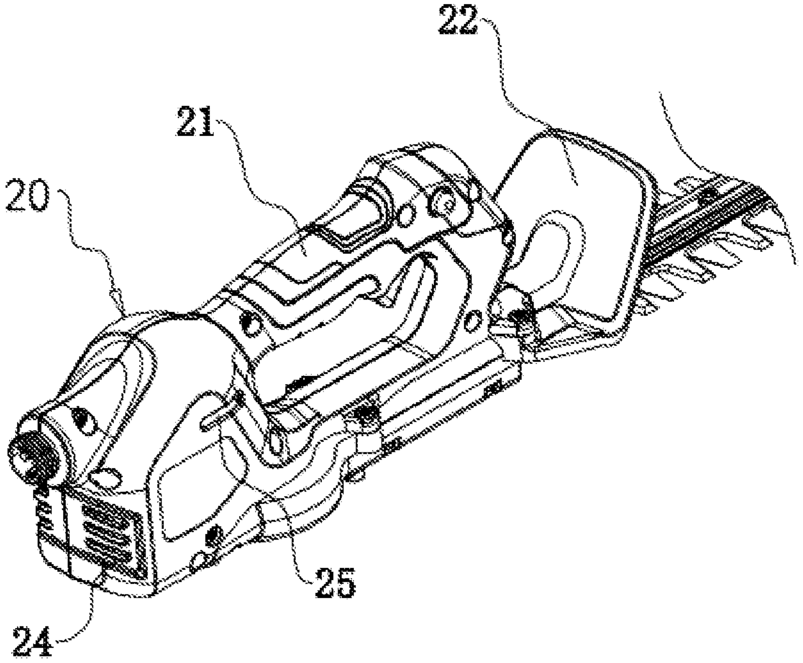
FIG. 10 is a schematic structural view of a housing of the power tool in the disclosure.

Please refer to FIG. 9 and FIG. 10. In some embodiments, the power tool may also include a housing 20, the working assembly 30, and a switch assembly 40. The housing 20 may include a transmission gearbox 29, which may be arranged at a bottom of the housing 20, and the transmission gearbox 29 may be used for mounting the transmission gear set 12. Part of the working assembly 30 may be passed through the transmission gearbox 29 and may be connected in transmission with the transmission gear set 12, which may be used to realize the reciprocating sliding movement of the working assembly 30. A control component may be mounted inside the housing 20 and may be used to control the start and stop of the motor 11, and the control component may include the switch assembly 40. The switch assembly 40 may include a control panel 44, and the control panel 44 may control the start and stop of the motor 11. A body of the power tool may also be externally connected with a power supply unit for providing energy to ensure that the power tool may work normally.

Please refer to FIG. 10. In some embodiments, the housing 20 may include two matched casings, and the housing 20 with an empty cavity may be formed by splicing the two casings. The housing 20 may be hollowed out, and may be formed with a handle 21. The handle 21 may be located in a middle of the housing 20. In this embodiment, a length direction of the handle 21 may be substantially parallel to an extending direction of the working assembly 30, and a center of gravity of the power tool may be located below the handle 21 in a vertical direction. With an arrangement of this structure, when the operator holds the handle 21 of the power tool, a weight of the power tool will correct a vibration of the power tool. In some embodiments, a number of handles 21 arranged on the housing 20 may be two, for example, one of the handles 21 may be mounted at a top position of the housing 20, and the other handle 21 may be mounted at a rear position of the housing 20.

Please refer to FIG. 10. In some embodiments, a protection shield 22 may be mounted on the housing 20 and may be located at a position where the working assembly 30 protrudes from the transmission gearbox 29. A protection plate of the protection shield 22 may be inclined toward a direction in which the working assembly 30 extends. When a user uses the power tool, it is possible to avoid operation errors which may cause the user to touch the blade, thereby improving safety.

Please refer to FIG. 1, FIG. 2, FIG. 10 and FIG. 11. In some embodiments, the fan blade 112 may be coaxially fixed on the output shaft of the motor 11, and the fan blade 112 may be located on a side away from the transmission gearbox 29. An air inlet 24 may be arranged on a side wall of the housing 20 away from the working assembly 30 in a length direction of the housing 20, and may correspond to a position of the control panel 44, and six air inlets 24 may be arranged symmetrically on the housing 20, and may be directly opposite to heat dissipation pieces of control panel 44. Air outlets 25 may be arranged on both symmetrical side walls of the housing 20, and may correspond to positions of the fan blades 112. A rotation of the motor 11 may drive a rotation of the fan blade 112, so that the fan blade 112 may discharge internal hot air through the air outlet 25, thereby forming a negative pressure inside the housing 20. An external atmospheric pressure may push external cold air into the housing 20 through the air inlet 24 to form a cooling cycle.

Figure 11:
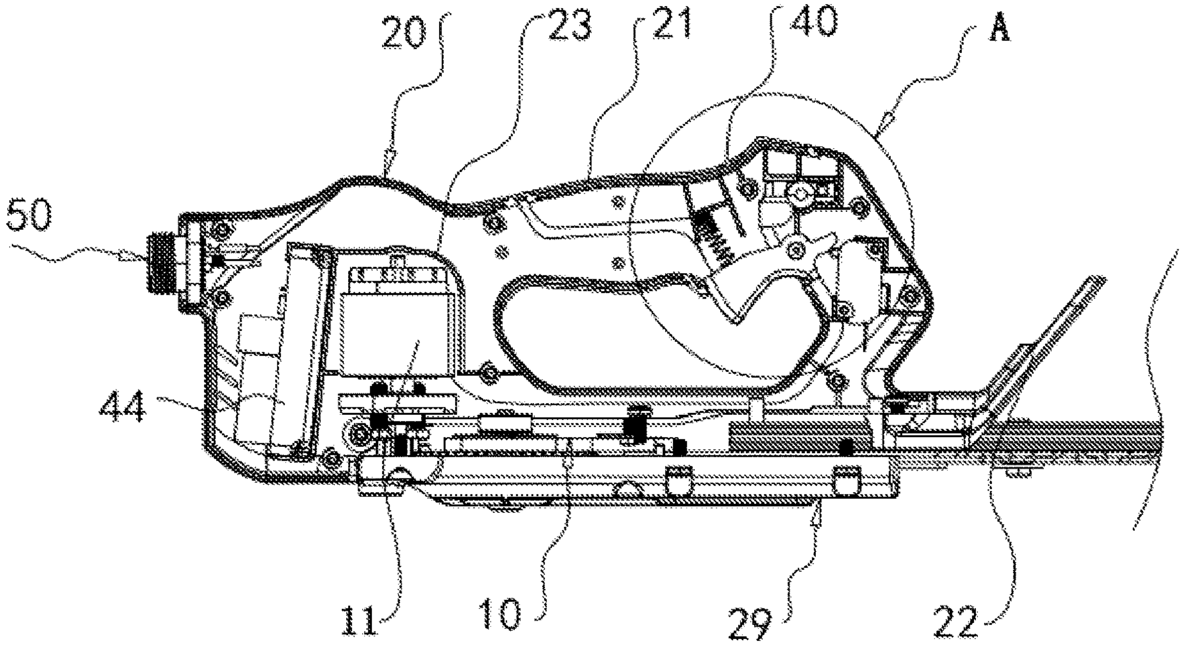
FIG. 11 is a schematic view of an internal structure of the housing of the power tool in the disclosure.

Please refer to FIG. 11. In some embodiments, inwardly protruding rib boards 23 may be arranged inside the housing 20, and the rib boards 23 may wrap and fix the control panel 44 and the motor 11. This kind of structure mounts different parts in different areas, and may increase a mounting stability of the control panel 44 and the motor 11. In addition, an air passage may be arranged between the rib board 23 and the inner wall of the housing 20, which may communicate with the air inlet 24 and the air outlet 25 mentioned above, so as to ensure an air circulation in the housing 20.

Please refer to FIG. 9 and FIG. 11. In some embodiments, the transmission gearbox 29 may include an upper housing 291 and a lower housing 292, which may be fixedly connected by bolts and form an empty cavity, and the transmission gear set 12 may be arranged in the empty cavity. A side of the transmission gearbox 29 in the length direction away from the motor 11 may be opened, and may be used to pass through the working assembly 30. A mounting hole may be arranged at a position of the motor 11 on the upper housing 291, so that the output shaft of the motor 11 may extend into the transmission gearbox 29 and be coaxially connected with the driving gear 121. In this embodiment, the transmission gearbox 29 may be made of metal, which may provide good structural strength and provide a mounting environment for mounting the working assembly 30. It also has good heat dissipation performance. The transmission gearbox 29 may be attached to the housing 20 and may be partially exposed to the air to facilitate the transmission gearbox 29 to dissipate heat.

Figure 12:
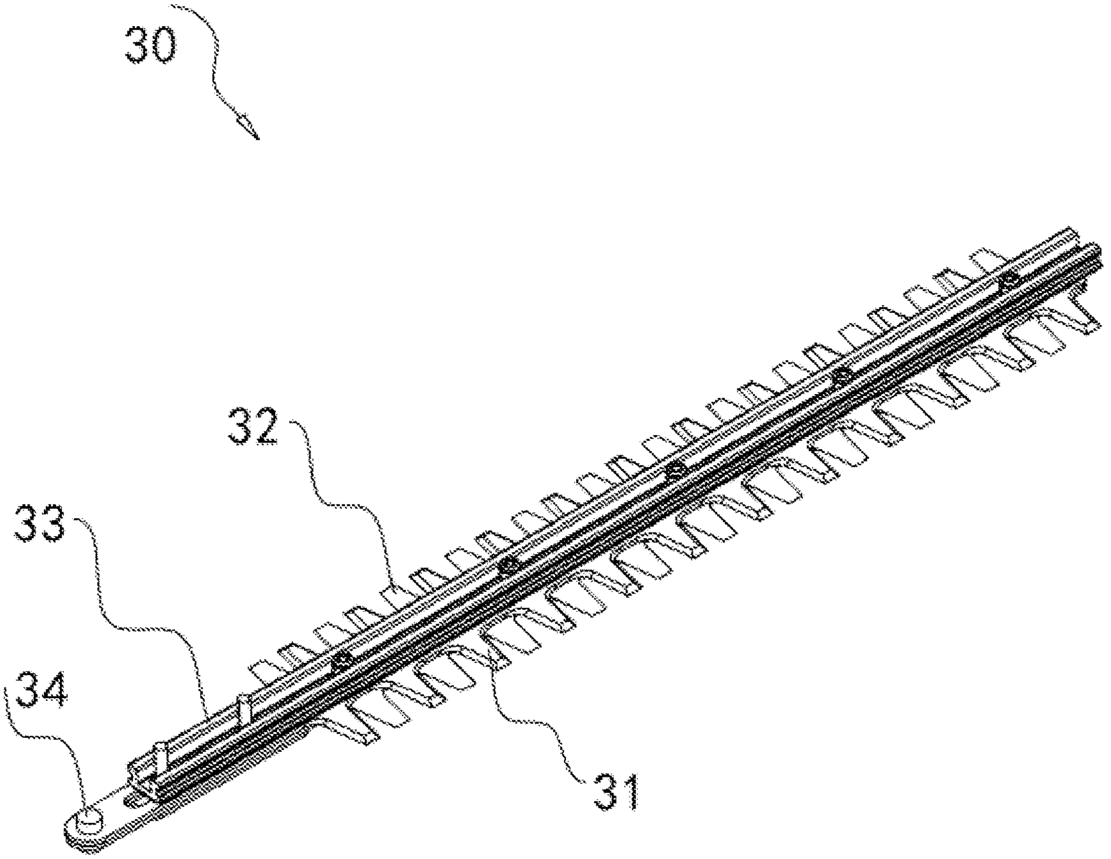
FIG. 12 is a schematic structural view of a working assembly of the power tool in the disclosure.

Please refer to FIG. 7, FIG. 9 and FIG. 12. In some embodiments, the working assembly 30 may include the upper blade 31, the lower blade 32 and a supporting arm 33. The upper blade 31 and the lower blade 32 are similar in structure, and both the upper blade 31 and the lower blade 32 may include a handle part and a sawtooth part. The handle part may be mounted in the transmission gearbox 29, a clamping block 34 may be formed near an end of the transmission gear set 12, and the clamping block 34 may be matched with the second connecting hole 132 on the crank connecting rod 13. The upper blade 31 and the lower blade 32 may correspond to the two crank connecting rods 13 respectively, and may be rotatably connected with the second connecting hole 132 through the clamping block 34.

Please refer to FIG. 1, FIG. 11 and FIG. 12. In some embodiments, a connection of crank connecting rod 13 between the upper blade 31 and the lower blade 32 is fixed with a limiting plate 133, the limiting plate 133 may be fixedly connected with a box body of transmission gearbox 29 by bolt, and the limiting plate 133 may reduce a situation that the crank connecting rod 13 is separated from the upper blade 31 and the lower blade 32. There may be a gap between the limiting plate 133 and the crank connecting rod 13, and when the crank connecting rod 13 is in operation, an interference of the limiting plate 133 on the operation of the crank connecting rod 13 may be avoided. The sawtooth parts of the upper blade 31 and the lower blade 32 may extend to an outside of the transmission gearbox 29 and the housing 20, and when the upper blade 31 and the lower blade 32 are overlapped, the sawtooth parts on the blades may be staggered.

Figure 13:
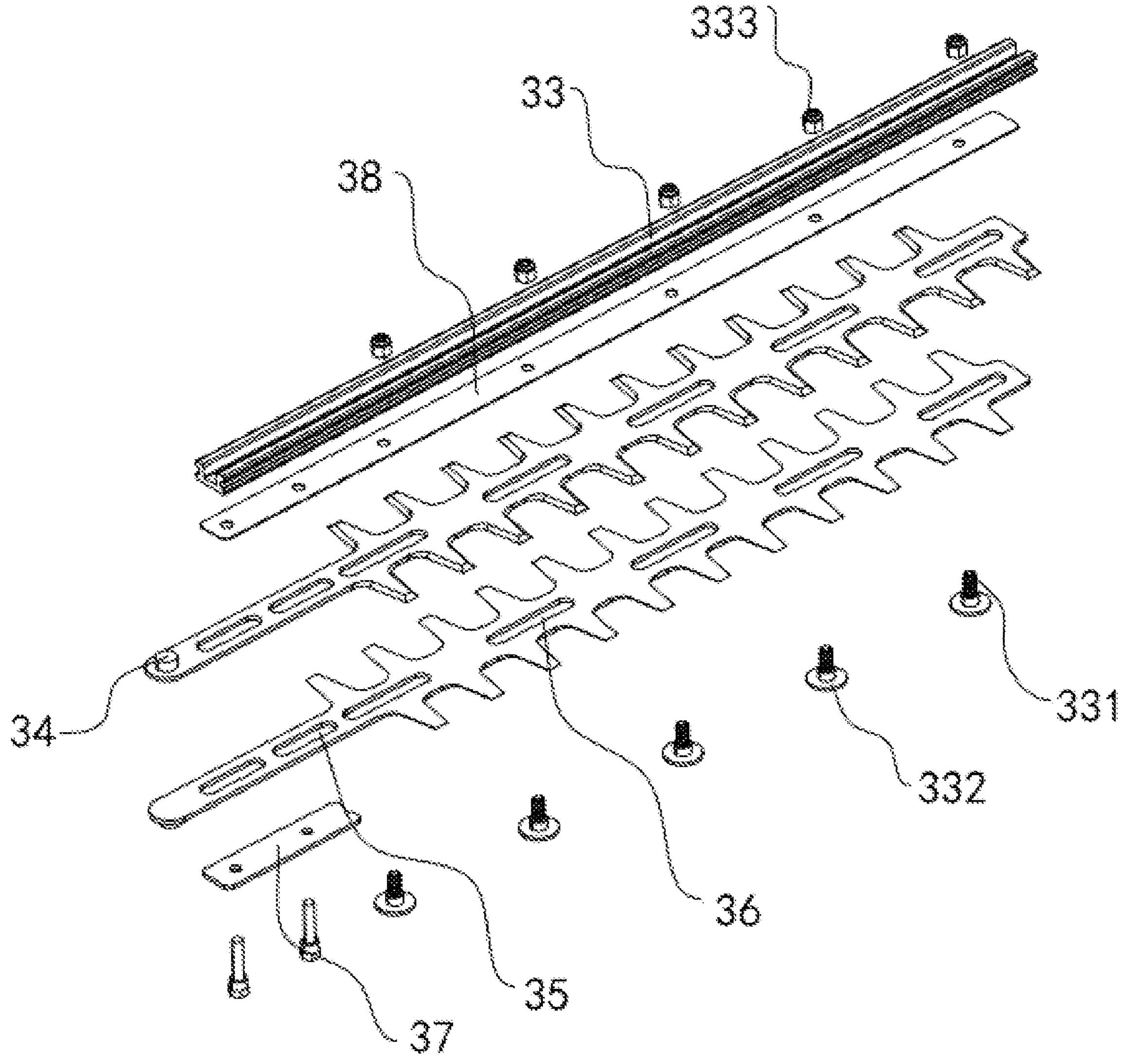
FIG. 13 is an exploded schematic view of the working assembly of the power tool in the disclosure.

Please refer to FIG. 12 and FIG. 13. In some embodiments, a middle position of the handle parts of the upper blade 31 and the lower blade 32 may be provided with a first slotted hole 35, and a length direction of the first slotted hole 35 may be parallel to a length direction of the upper blade 31 and the lower blade 32. In this embodiment, two first slotted holes 35 may be arranged along the length direction of the upper blade 31 and the lower blade 32, and positions, shapes and sizes of the first slotted holes 35 on the upper blade 31 and the lower blade 32 may be the same. The first slotted hole 35 may be passed through by bolts to achieve an effect of being fixedly connected with the transmission gearbox 29.

Please refer to FIG. 12 and FIG. 13. In some embodiments, the middle positions of sawtooth parts of the upper blade 31 and the lower blade 32 are all provided with a second slotted hole 36, and a length direction of the second slotted hole 36 is parallel to the length direction of the upper blade 31 and the lower blade 32. The second slotted hole 36 may be passed through by bolts to achieve an effect of fixedly connecting the upper blade 31 and the lower blade 32 to the supporting arm 33. In this embodiment, five second slotted holes 36 are arranged along the length direction of the upper blade 31 and the lower blade 32, and positions, shapes and sizes of the second slotted holes 36 on the upper blade 31 and the lower blade 32 are the same. Through the first slotted hole 35 and the second slotted hole 36, a sliding direction of the upper blade 31 and the lower blade 32 may be ensured, and a sliding stability may be maintained.

Please refer to FIG. 13. The supporting arm 33 may be fixed on a side of the upper blade 31 away from the lower blade 32, and a length direction of the supporting arm 33 may be in a same direction as the length direction of the upper blade 31 and the lower blade 32. In this embodiment, a part of the supporting arm 33 which extends into the transmission gearbox 29 may be fixedly connected with the transmission gearbox 29 by bolts, and a side of the lower blade 32 away from the upper blade 31 may be connected with a fixing plate 37 by screws. The length direction of the fixing plate 37 may be parallel to the length direction of the lower blade 32, and may be located at a position of the handle part on the lower blade 32, and the bolt may pass through the fixing plate 37, the first slotted holes 35 on the upper blade 31 and the lower blade 32, and the supporting arm 33 in sequence. The fixing plate 37 may increase a connecting strength between the handle part of the blade and the crank connecting rod 13, thereby increasing an overall bending resistance of the blade. On a side of the upper blade 31 away from the lower blade 32 may be fixed with a pressing plate 38, a length direction of the pressing plate 38 may be parallel to the length direction of the upper blade 31, and a length dimension of the pressing plate is similar to a length of the upper blade 31, and the pressing plate may be located at a middle position of upper blade 31.

Please refer to FIG. 13. In some embodiments, fixing bolts may be threadedly connected with the supporting arm 33, the fixing bolt 331 may pass through the second slotted hole 36 on the upper blade 31 and the lower blade 32, pressing plate 38 and supporting arm 33 in sequence, and may correspond to the second slotted hole 36 one by one. A gasket 332 may be penetrated and be arranged on each fixing bolt 331, and may be located between a nut of the fixing bolt 331 and the lower blade 32. An end of each fixing bolt 331 may be threaded with a fixing nut 333, and the fixing nut 333 may abut against the supporting arm 33. Since the upper blade 31 and the lower blade 32 may extend longer to an outside of the transmission gearbox 29 and the housing 20, ends of the upper blade 31 and the lower blade 32 away from the transmission gearbox 29 and the housing 20 may cause an entire blade to deform due to gravity. The supporting arm 33 may share a weight of each part of the blade, thereby increasing the overall bending resistance of the blade.

Please refer to FIG. 11. In this embodiment, the control component may include the switch assembly 40. The switch assembly 40 may be mounted at a position of the handle 21, and the control panel 44 may control a start and stop of the outer rotor motor 11. The control panel 44 in the switch assembly 40 may be mounted in the housing 20, and may be located at a side of the motor 11 away from the working assembly 30, and an end of the housing 20 near the control panel 44 may be provided with a power port 50, and the power port 50 may be electrically connected with the control panel 44.

Figure 14:
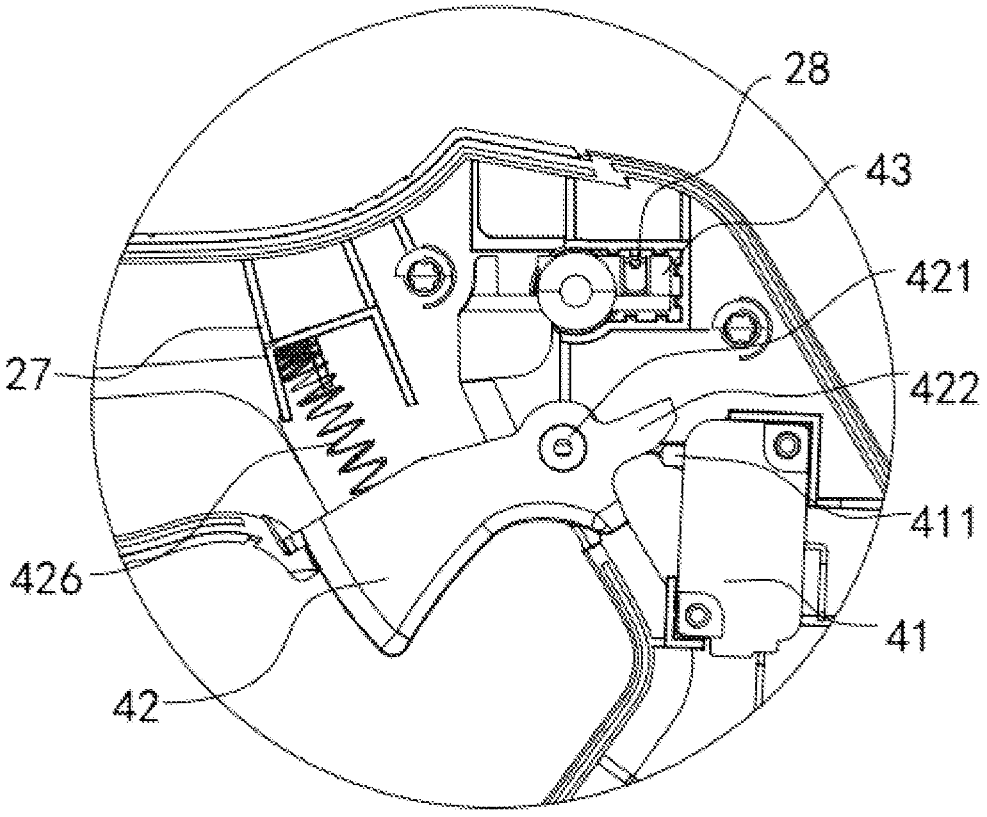
FIG. 14 is an enlarged view of part A in FIG. 11, mainly showing a structure of a switch assembly.
Figure 15:
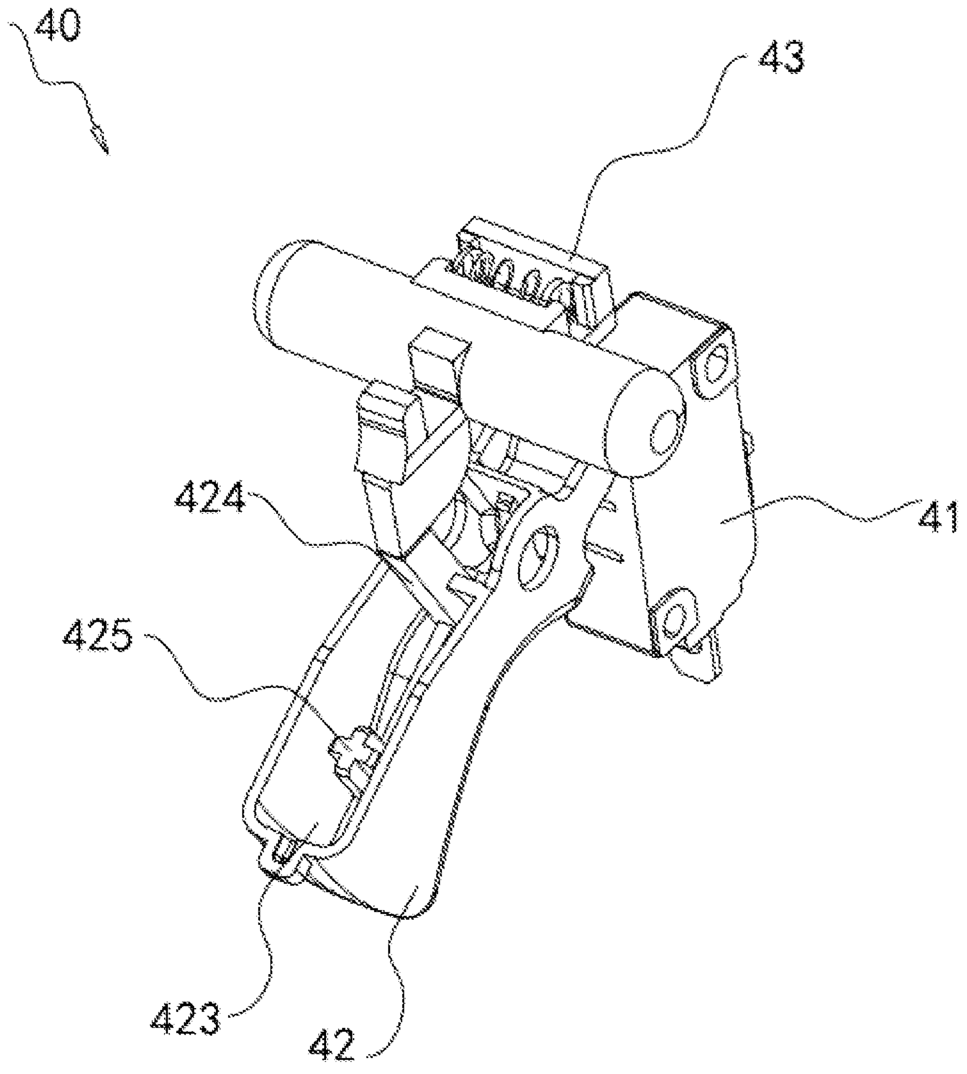
FIG. 15 is a schematic structural view of the switch assembly of the power tool in the disclosure.

Please refer to FIG. 11, FIG. 14 and FIG. 15. In this embodiment, the switch assembly 40 may further include a micro switch 41, the switch trigger 42 and a locking trigger 43. The micro switch 41 may be vertically mounted in the housing 20 and may be located close to the working assembly 30, and the micro switch 41 may be electrically connected with the control panel 44 and may control a start and stop of the power tool. The switch trigger 42 may be rotatably connected in the housing 20, and located at the handle 21, and part of the switch trigger 42 may be located in the hollowed out position of the housing 20, which is convenient for the user's finger to control the switch trigger 42 to rotate on a fixed axis. The locking trigger 43 is slidably connected with the housing 20, may be located on an upper side of the switch trigger 42, slide along a rotating axis of the switch trigger 42, and be used to lock the switch trigger 42.

Please refer to FIG. 11, FIG. 14 and FIG. 15. In some embodiments, the switch trigger 42 may further include a connecting shaft 421 and a contacting end 422. The connecting shaft 421 may be fixedly connected with an inner side wall of the housing 20, and may penetrate the switch trigger 42, which may be rotatably connected with the switch trigger 42, and a length direction of the connecting shaft 421 may be perpendicular to the length direction of the upper blade 31 and the lower blade 32. The contacting end 422 is arranged on the switch trigger 42, may be located close to the micro switch 41, and correspond to the contacting point 411 on the micro switch 41. In actual operation, the user's finger is in contact with the part of the switch trigger 42 located in the hollow of the housing 20, and the finger may be lifted upwards, so that the contacting end 422 of the switch trigger 42 is rotated downward, and the contacting end 422 may abut against the contacting point 411 of the micro switch 41 and prompt the micro switch 41 to start the power tool.

Please refer to FIG. 14 and FIG. 15. In some embodiments, a groove 423 may be formed on an end of the switch trigger 42 away from the contacting end 422, and an elastic component may abut between a bottom wall of the groove 423 and the inner wall of the housing 20. In this embodiment, the elastic component is a first spring 426. Two ends of the first spring 426 may abut against the bottom wall of the groove 423 and the inner wall of the housing 20 respectively. A cross block 425 may protrude from the groove 423, and one end of the first spring 426 may be sleeved on the cross block 425, which may be used for mounting the first spring 426. When the user releases the switch trigger 42, the first spring 426 will drive the switch trigger 42 to reset, so that the contacting end 422 is separated from the contacting point 411 of the micro switch 41, and the power tool may be turned off.

Figure 16:
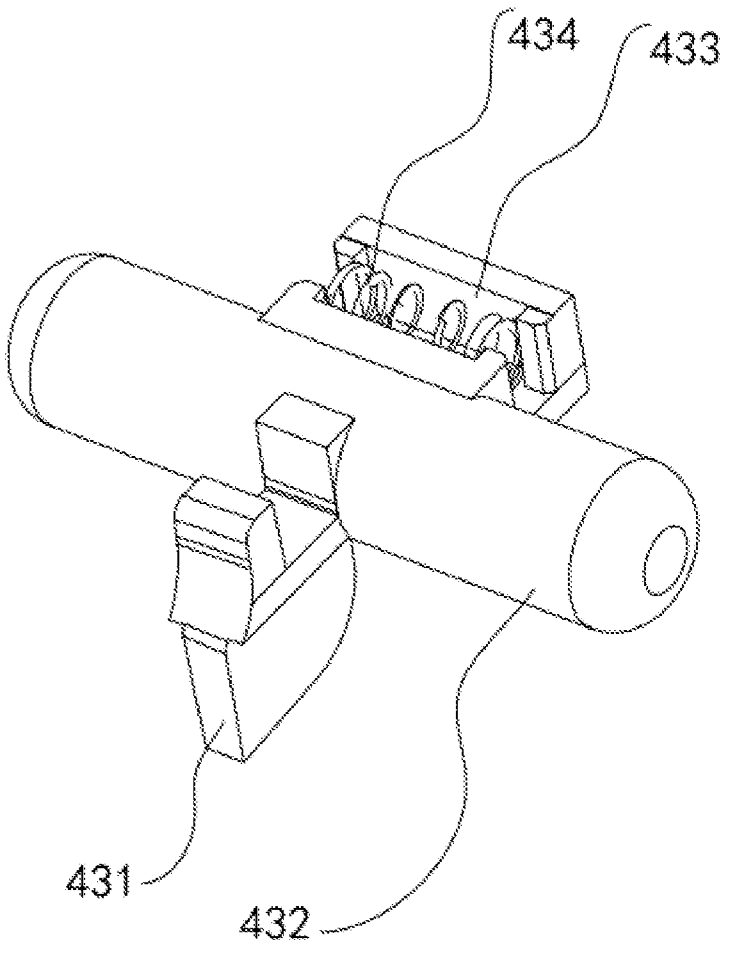
FIG. 16 is a schematic structural view of a locking trigger of the power tool in the disclosure.

Please refer to FIG. 14 and FIG. 16. In some embodiments, the locking trigger 43 may include a locking plate 431, a sliding shaft 432, a mounting groove 433 and a second spring 434. The sliding shaft 432 may be arranged and pass through the housing 20, an axis of the sliding shaft 432 may be parallel to an axis of the connecting shaft 421, and both ends of the sliding shaft 432 may extend to an outside of the handle 21. This structural arrangement may facilitate an operation of the power tool by a left or right hand of the user. The locking plate 431 may be fixed at a middle of the sliding shaft 432 and may correspond to a protruding abutting plate 424 in the groove 423 of the switch trigger 42. The mounting groove 433 may be provided on the locking trigger 43 and may correspond to the middle of the sliding shaft 432. The second spring 434 may be embedded in the mounting groove 433, its two ends may respectively abut against an inner side wall of the mounting groove 433, a length direction of the second spring 434 may be parallel to a length direction of the sliding shaft 432, openings are respectively provided on two opposite side walls of the mounting groove 433 along the length direction of the second spring 434, a blocking plate 28 may be arranged on both sides of the locking trigger 43 in the housing 20, and the two openings may correspond to the blocking plates 28 one by one. When the locking trigger 43 is slid, the blocking plate 28 will enter into the mounting groove 433, so that the second spring 434 is in a compressed state, and may provide power for a subsequent reset operation.

Please refer to FIG. 14 and FIG. 15. In some embodiments, a top of the switch trigger 42 in the housing 20 may be provided with a resisting plate 27, and there may be two resisting plates 27 in the housing 20, and lengths of the two resisting plates 27 are different. A length of the resisting plate 27 close to the locking trigger 43 may be greater than a length of the other resisting plate 27, and the first spring 426 may be located between the two resisting plates 27. The resisting plate 27 may limit a rotating angle of the switch trigger 42 and prevent the switch trigger 42 from fully sinking into the housing 20 as a whole. In addition, the two resisting plates 27 with different lengths may be adapted to a structural shape of the switch trigger 42, so that the switch trigger 42 and the resisting plate 27 are fully abutted.

Please refer to FIG. 14, FIG. 15 and FIG. 16. In some embodiments, in an absence of external force, the locking plate 431 on the switch trigger 42 may abut against the abutting plate 424 on the switch trigger 42, so that the switch trigger 42 may be in an inactive state. In this state, an end of the locking plate 431 close to the switch trigger 42 may abut against an end of the abutting plate 424 close to the locking trigger 43, so that the user may not press the switch trigger 42, thereby reducing an occurrence of a power tool starting caused by the user's unintentional touch. When it is necessary to start the power tool, the user may press and slide the sliding shaft 432 connected with the housing 20, so that the sliding shaft 432 drives the locking plate 431 to slide, and the locking plate 431 may be separated from the abutting plate 424. At this time, the switch trigger 42 is in an activated state, and the user may lift the finger upwards, which may enable the contacting end 422 of the switch trigger 42 to rotate downward, thereby the contacting end 422 abutting against the contacting point 411 of the micro switch 41 and prompting the micro switch 41 to activate the power tool. After the power tool is used, the user may release the switch trigger 42, which may reset the switch trigger 42, and then the compressed second spring 434 may drive the sliding shaft 432 to slide, which may reset the locking trigger 43, thereby enabling the locking plate 431 to abut against the abutting plate 424 again, so that the switch trigger 42 is in the inactive state again.

Figure 17:
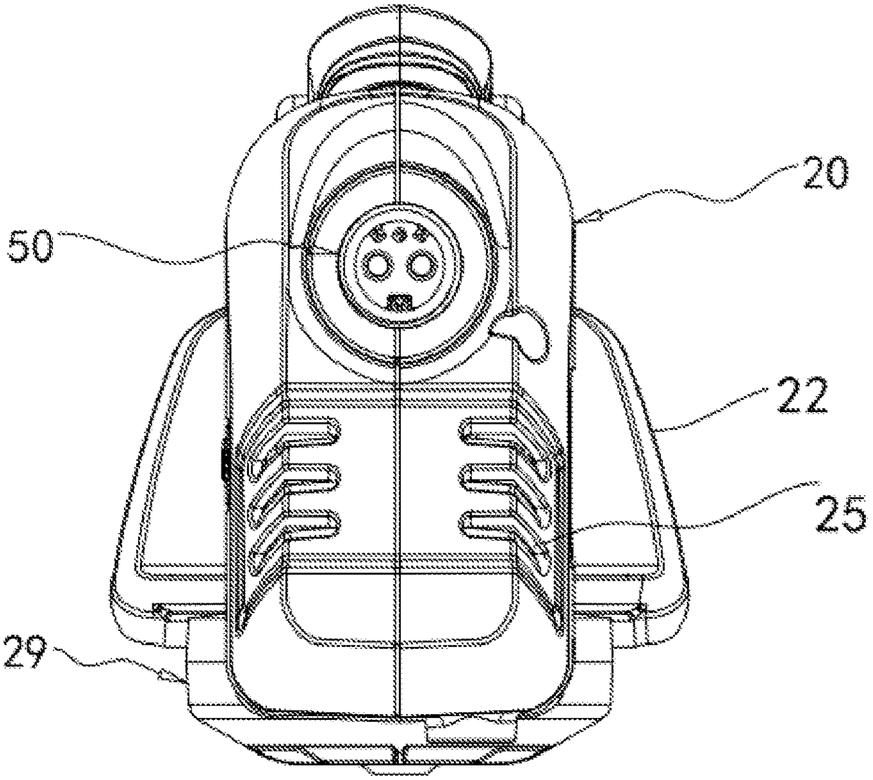
FIG. 17 is an external schematic view of a power port of the power tool in the disclosure.
Figure 18:
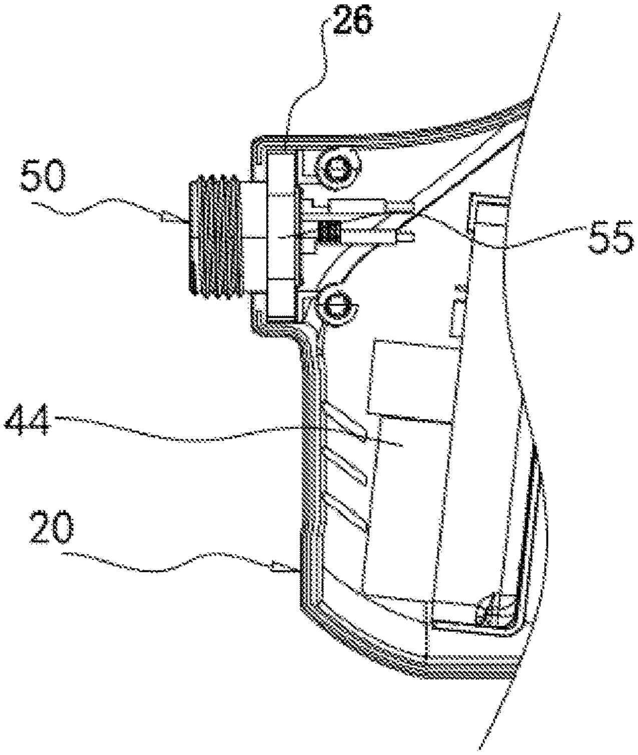
FIG. 18 is a schematic mounting view of the power port of the power tool in the disclosure.
Figure 19:
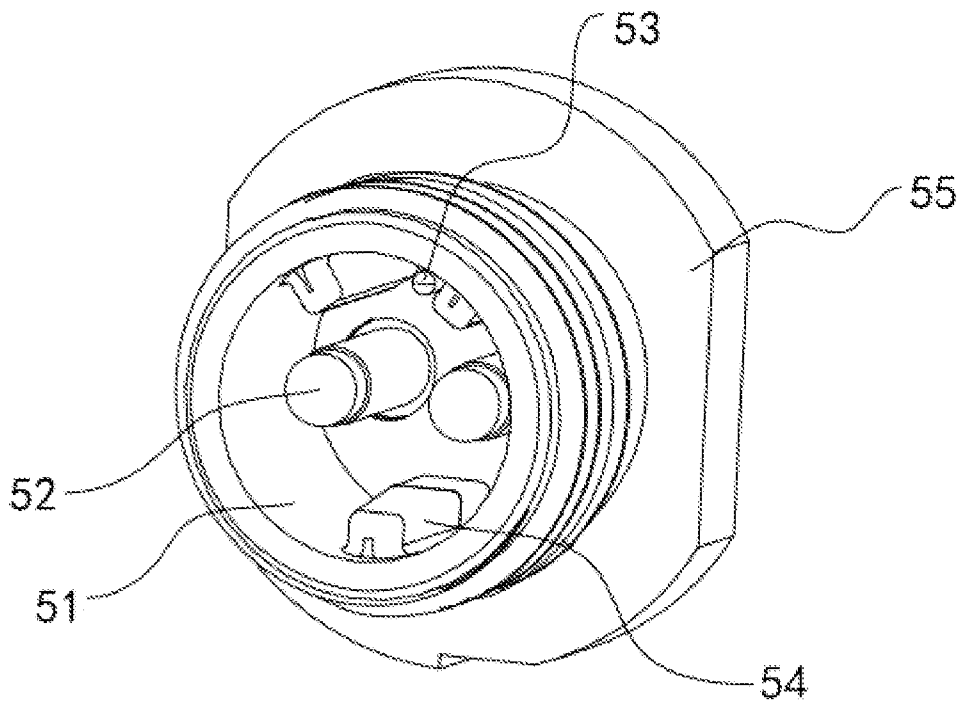
FIG. 19 is an axonometric view of the power port of the power tool in the disclosure.

Please refer to FIG. 17, FIG. 18 and FIG. 19. In some embodiments, a power port 50 may be mounted on an end of the housing 20 away from the protection shield 22 and may protrude outward. The end of the housing 20 away from the protection shield 22 may be provided with a clamping groove 26, and an end of the power port 50 may be provided with a clamping blocking plate 55 that is coupled with the clamping groove 26, and the clamping blocking plate 55 may be embedded inside the clamping groove 26. A notch 51 may be arranged in a middle of the power port 50, and positive and negative columns 52 and a signal line 53 may be arranged in the notch 51. A plurality of positioning protrusions 54 may be arranged on an inner side wall of the notch 51. In this embodiment, three positioning protrusions 54 may be arranged in the notch 51, and distances between the three positioning protrusions 54 are different, and a position error of the power cable 100 when inserted may be avoided by the positioning protrusions 54.

Figure 20:
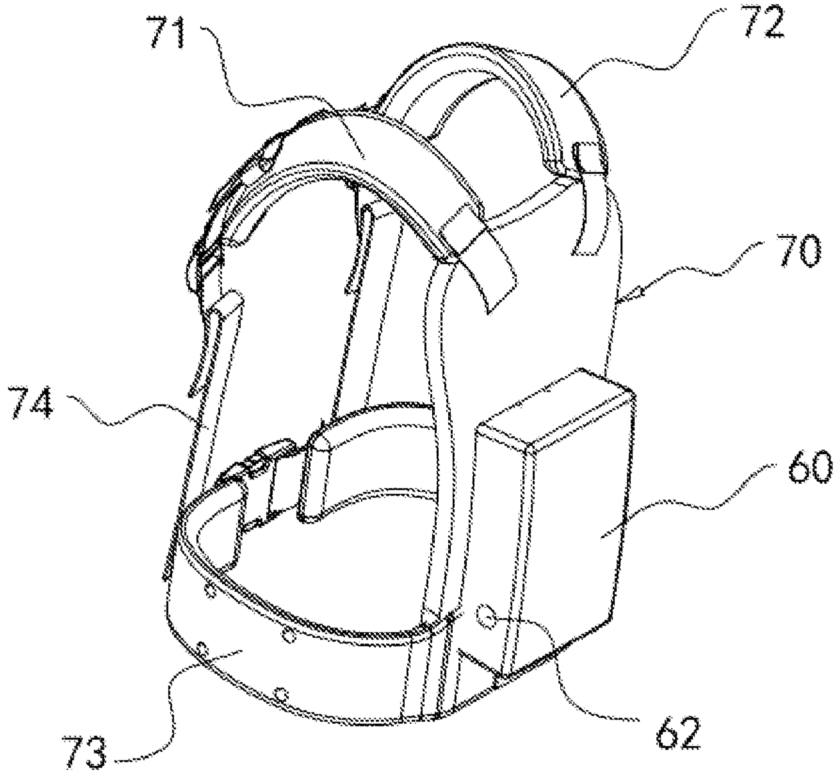
FIG. 20 is an axonometric view of a backpack of the power tool in the disclosure.
Figure 22:
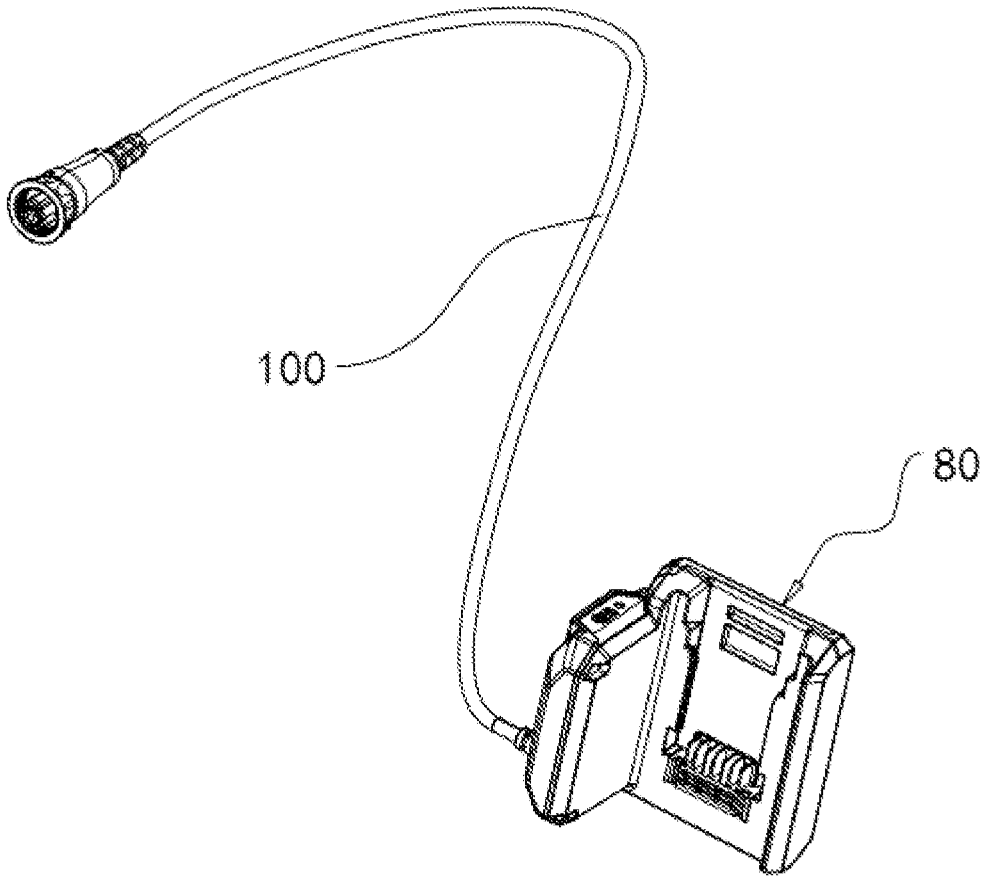
FIG. 22 is a schematic structural view of a power supply unit of the power tool in the disclosure.

Please refer to FIG. 20 and FIG. 22. In some embodiments, the disclosure may further provide a power supply device, which may be electrically connected with the power port 50 of the power tool through a wire set, and may provide electric energy for the power tool to ensure that the power tool may work normally. In some embodiments, the power supply device may include a bag body 60, a backpack 70, the power supply unit and a power cable 100. Wherein, the backpack 70 may be connected with the bag body 60 for the user to wear and carry the bag body 60. The power supply unit may be placed inside the bag body 60. A first end of the power cable 100 may be electrically connected with the power supply unit, and a second end may pass through a side wall of the bag body 60 and extend to an outside the bag body 60.

Figure 21:
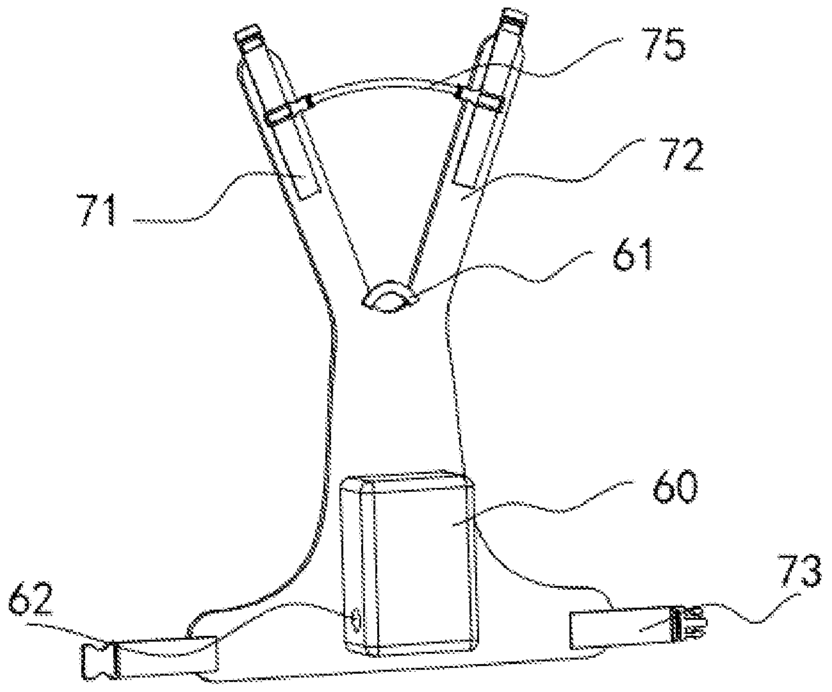
FIG. 21 is an expanded view of a backpack of the power tool in the disclosure.

Please refer to FIG. 20, FIG. 21 and FIG. 22. In this embodiment, the bag body 60 may be in a rectangle shape as a whole, the power supply unit may be placed in the bag body 60, and the power supply unit may be fixed on a backpack belt 73 of the backpack 70 by screws. A carrying handle 61 may be fixed on a top of the bag body 60, and the carrying handle 61 may facilitate the user to take an entire power supply unit. Through holes 62 are symmetrically arranged on both side walls of the bag body 60, and the through holes 62 may be located at a bottom of the side walls of the bag body 60. The power cable 100 may pass through the through holes 62 and be connected with the power port 50 on the power tool, and the power cable 100 is used to connect the power port 50 and the power supply unit to supply power to the power tool. The power cable 100 may be pulled out from a left or right side of the bag body 60, and the user may choose the power cable 100 on the left or right side of the bag body 60 according to their own habits or actual conditions, which improves an adaptability and convenience of the power cable 100.

Please refer to FIG. 20 and FIG. 21. In this embodiment, the backpack 70 may include backpack strap and backpack belt 73. Wherein, the backpack strap may include a left backpack strap 71 and right backpack strap 72, first ends of left backpack strap 71 and right backpack strap 72 may be connected with the both sides of the tops of the bag body 60 respectively by sewing, and second ends of left backpack strap 71 and right backpack strap 72 may be bent toward a user's chest. Two backpack belts 73 may be arranged on the bag body 60, and first ends of the two backpack belts 73 may be connected with both sides of a bottom of the bag body 60 by sewing, and second ends of the two backpack belts 73 may be bent along a waist of the user and connected by a buckle.

Please refer to FIG. 20 and FIG. 21. In some embodiments, a position before the user's waist on the two backpack belts 73 may be vertically provided with a connecting belt 74, and first ends of the two connecting belts 74 may be connected with the corresponding backpack belt 73 by sewing, and second ends may corresponds to and be connected with the left backpack strap 71 and the right backpack strap 72 by a buckle. Both the left backpack strap 71 and the right backpack strap 72 may be horizontally provided with a fixing belt 75, and first ends of the two fixing belts 75 may be connected with the corresponding left backpack strap 71 and the right backpack strap 72 by sewing, and second ends of the two fixing belts 75 may be connected by a buckle. Through the left backpack strap 71, the right backpack strap 72, the backpack belt 73, the connecting belt 74 and the fixing belt 75, the bag body 60 is worn and carried on a user's body, which may ensure a firmness of wearing.

Figure 23:
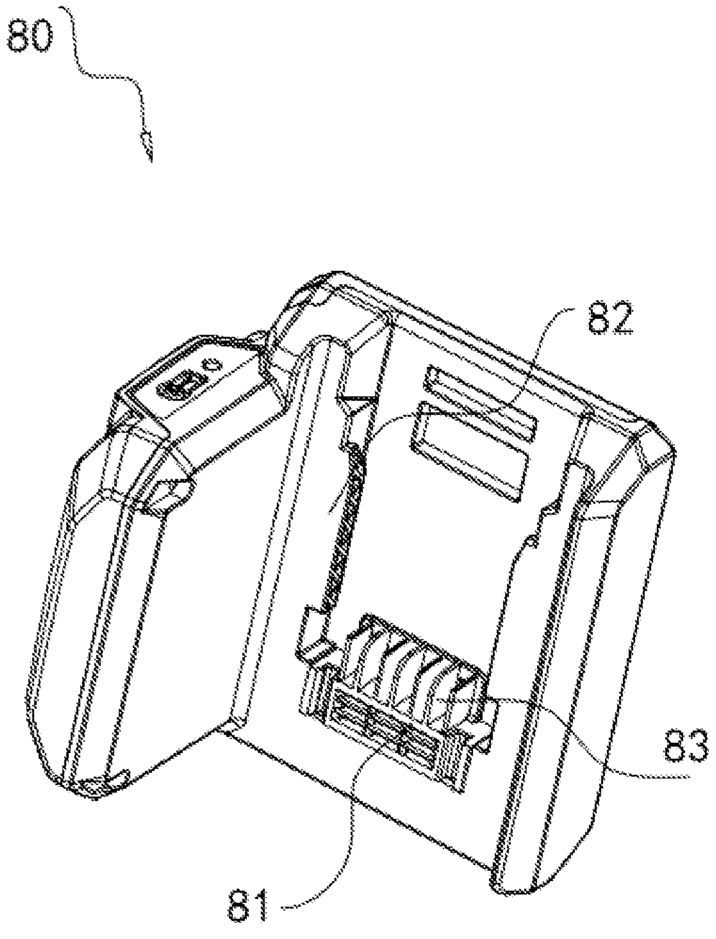
FIG. 23 is a schematic structural view of a mounting base of the power tool in the disclosure.
Figure 24:
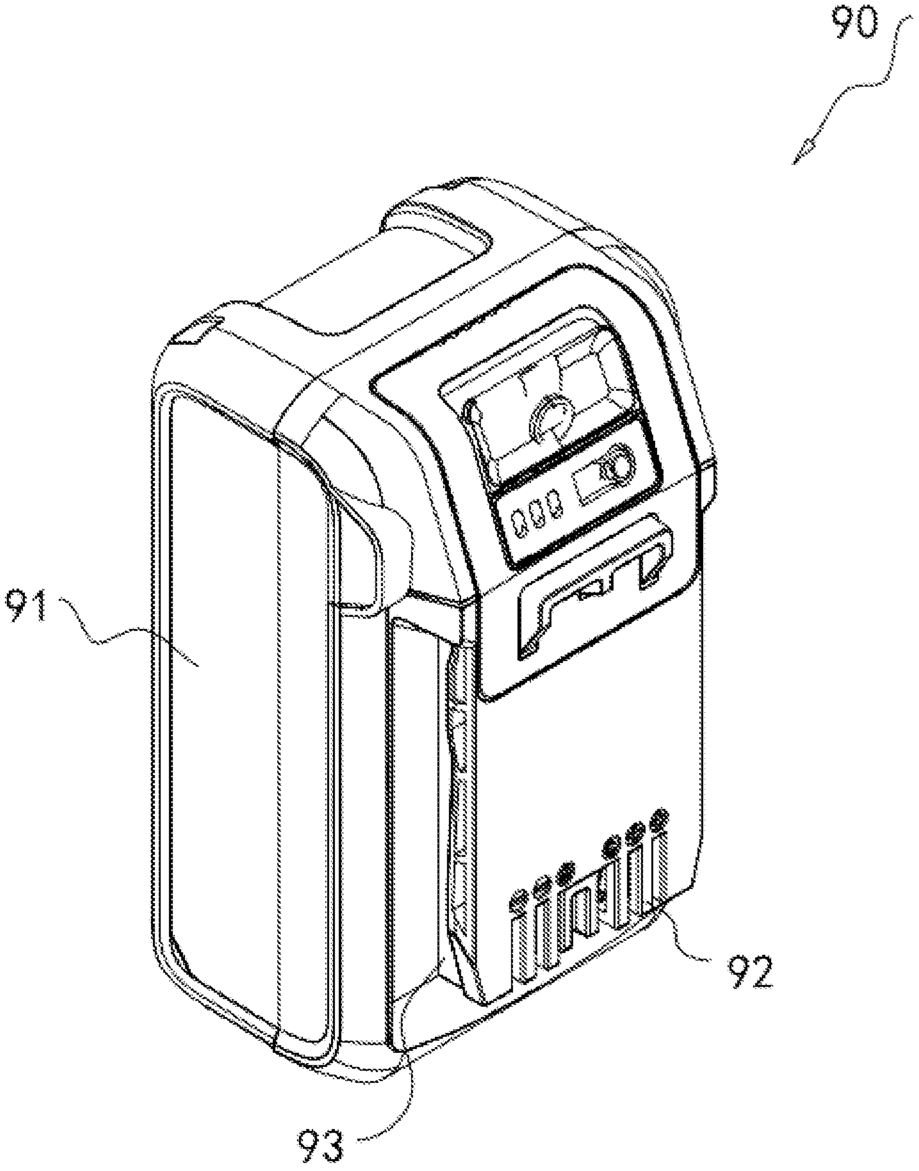
FIG. 24 is a schematic structural view of a battery pack of the power tool in the disclosure.

Please refer to FIG. 22, FIG. 23 and FIG. 24. In this embodiment, the power supply unit may include a battery pack 90 and a mounting base 80. The mounting base 80 may be L-shaped as a whole, and the mounting base 80 may be used to clamp the battery pack 90, so that the battery pack 90 may be detachably connected to the mounting base 80, a bottom of a side plate of the mounting base 80 may be fixed with an inserting base 81, and the inserting base 81 may be provided with a plugging terminal 83 that is compatible with the battery pack 90. On the mounting base 80, a positioning plate 82 may be fixed on an upper side of the plugging terminal 83, two positioning plates 82 may be arranged on the mounting base 80, and the two positioning plates 82 may respectively correspond to both sides of the plugging terminal 83. And there may be a gap between the positioning plate 82 and a side wall of the mounting base 80. A positioning and fixing of the battery pack 90 may be realized through the positioning plate 82 on the mounting base 80. In an embodiment, the power supply unit may include the battery pack 90, and the battery pack 90 may be arranged inside the housing 20. The battery pack 90 is integrated with the housing 20, and no additional power supply unit is required. After the battery pack 90 is charged, the power tool may be used for a long time. In an embodiment, the power supply unit may also include other types of alternative current and direct current power source, and may be connected with the power port 50 through the power cable 100 to provide energy for the power tool.

Please refer to FIG. 22, FIG. 23 and FIG. 24. In some embodiments, the battery pack 90 may include a mounting housing 91 and a power supply terminal 92, and a cavity may be formed inside the mounting housing 91 for mounting battery cells. The power supply terminal 92 may be mounted on an outer side surface of the mounting housing 91 and may be electrically connected with the battery cells inside, and the power supply terminal 92 may be coupled with the plugging terminal 83 on the inserting base 81. An inserting groove 93 may be formed on the mounting housing 91, and embedded with the positioning plate 82 on the mounting base 80. In this embodiment, two inserting grooves 93 may be arranged on the mounting housing 91, located on two sides of the battery pack 90 in a width direction, and correspond to the positioning plates 82 one by one.

Figure 25:
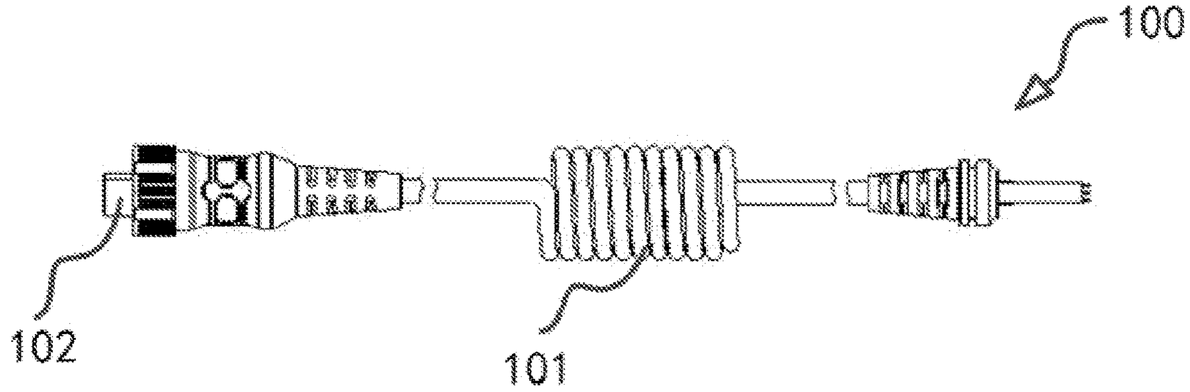
FIG. 25 is a schematic structural view of a power cable of the power tool in the disclosure.
Figure 26:
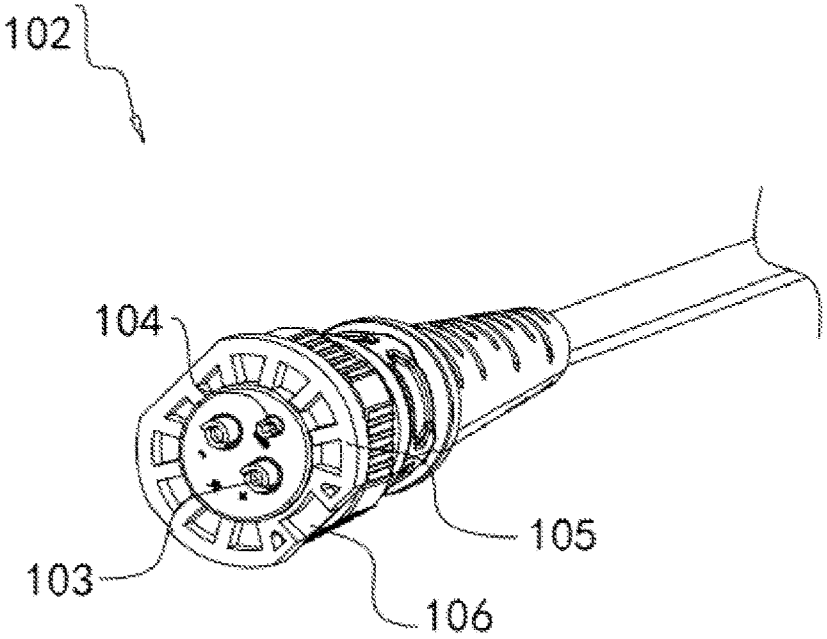
FIG. 26 is a schematic structural view of a joint end of the power cable of the power tool in the disclosure.

Please refer to FIG. 25 and FIG. 26. In this embodiment, a middle part of the power cable 100 may be configured as a spring cable 101. The spring cable 101 may enable the power cable 100 to have an ability of compression. Compared with a conventional power cable 100, excessive length of the power cable 100 which passes out through the bag body 60 is avoided, which is convenient for the operator to use. If the power cable 100 is too short, a usage of the power supply device is limited. Adopting a structure of the spring cable 101 may solve the above problems and improve a practical applicability of the power supply device and a convenience of the user's operation. In addition, the signal line 53 may further be threaded inside the power cable 100.

Please refer to FIG. 25 and FIG. 26. In this embodiment, one end of the power cable 100 extending outside the bag body 60 may include a joint end 102, and may be electrically connected with the power tool through the joint end 102. The joint end 102 may be provided with positive and negative terminals 103 and a signal terminal 104, the positive and negative terminals 103 may be connected with the power cable 100, and the signal terminal 104 may be connected with the signal line 53. In addition, a clamping plate 105 is sleeved on the joint end 102. The clamping plate 105 may be roughly obround shaped and an arc end wall of the clamping plate 105 may be adapted to an inner wall of the power port 50. It should be noted that, a plurality of hollows may be arranged at intervals on the clamping plate 105, which may reduce a quality of the power cable 100. An embedding groove 106 may be provided at an edge of the joint end 102, and the embedding groove 106 may be embedded with the power port 50 on the power tool, so as to achieve a stable connection between the joint end 102 and the power port 50.

In summary, the disclosure may greatly reduce a volume and weight of the whole device, which enables it to be easy to mount and carry. In addition, a lower rotating speed and transmission ratio may reduce energy consumption, thereby increasing a duration life of a battery and increasing a battery life of the device. Through opening through holes on opposite sides of the bag body and passing through the power cable in the through holes, the power cable may be selectively pulled out from the through holes on both sides of the bag body, and an optionality and convenience of pulling out the power cable in a backpack power supply device are improved.

The above description is only a preferred embodiment of the disclosure and an explanation of the applied technical principles. Those skilled in the art should understand that a scope involved in this disclosure is not limited to a technical solution formed by a specific combination of the above technical characteristics, it should also cover other technical solutions formed by any combination of the above technical characteristics or their equivalent characteristics without departing from the disclosure.

What is claimed is:

1. A power device, comprising:

a motor; and a transmission gear set, connected with the motor in a transmission and comprising:

a driving gear, fixed to an output shaft of the motor; and a driven gear, meshing with the driving gear;

wherein, a speed of the motor is from 5000 rpm to 11000 rpm, a diameter of the motor is from 20 mm to 50 mm, and a volume of the motor is from 600 $mm^3$ to 2200 $mm^3$, a weight of the motor is from 90 g to 260 g, and a reduction ratio of the driving gear to the driven gear is from 2 to 7;

a product value of the weight of the motor and a current is in a range of 54 g*A to 1040 g*A, and a product value of the volume of the motor and the current is in a range of 360 $mm^3$*A to 8800 $mm^3$*A.

2. The power device according to claim 1, wherein the motor is an outer rotor motor, a rotating speed of the motor is 10000 rpm, and the diameter of the motor is from 35 mm to 40 mm.

3. The power device according to claim 1, wherein the reduction ratio of the driving gear and the driven gear is 5.

4. The power device according to claim 1, wherein the transmission gear set further comprises:

an eccentric block, fixed on the driven gear, a center of the eccentric block being misaligned with a center of the driven gear, and the eccentric block being connected with a working assembly of a power tool in a transmission; and a crank connecting rod, a first end of the crank connecting rod being rotatably connected with the eccentric block, and a second end of the crank connecting rod being rotatably connected with the working assembly of the power tool, and being configured to drive a blade of the power tool to reciprocate.

5. The power device according to claim 4, wherein at least two eccentric blocks are arranged on the driven gear, which are respectively located on two sides of the driven gear, and arranged symmetrically along the center of the driven gear.

6. A power tool, comprising:

a power tool body; and a power device, arranged in the power tool body, and the power device comprising:

a motor, and a transmission gear set, connected with the motor in a transmission and comprising:

a driving gear, fixed to an output shaft of the motor, and a driven gear, meshing with the driving gear;

wherein, a speed of the motor is from 5000 rpm to 11000 rpm, a diameter of the motor is from 20 mm to 50 mm, and a volume of the motor is from 600 $mm^3$ to 2200 $mm^3$, a weight of the motor is from 90 g to 260 g, and a reduction ratio of the driving gear to the driven gear is from 2 to 7;

a product value of the weight of the motor and a current is in a range of 54 g*A to 1040 g*A, and a product value of the volume of the motor and the current is in a range of 360 $mm^3$*A to 8800 $mm^3$*A.

7. The power tool according to claim 6, wherein the power tool body comprises:

a housing, hollowed out in a middle and provided with a handle;

a transmission gearbox, arranged at a bottom of the housing and configured to mount the transmission gear set;

a working assembly, connected with the transmission gear set in a transmission; and a control component, mounted in the housing and configured to control a start and stop of the motor.

8. The power tool according to claim 7, wherein the working assembly comprises:

an upper blade, partially extending into the transmission gearbox and rotatably connected with a crank connecting rod, and the upper blade located outside the transmission gearbox being provided with a saw tooth;

a lower blade, partially protruding into the transmission gearbox and rotatably connected with the crank connecting rod, and provided with a same structure as the upper blade, and a saw tooth on the lower blade and the saw tooth on the upper blade being misaligned; and a supporting arm, partially extending into the gear transmission box, and fixedly connected with the upper blade and the lower blade by bolts.

9. The power tool according to claim 7, wherein the control component comprises:

a micro switch, mounted in the housing and located near the handle of the housing; and a switch trigger, rotatably connected with the handle, and the switch trigger comprising:

a connecting shaft, fixedly connected with an inner wall of the housing, mounted on a side of the switch trigger close to the micro switch, and rotatably connected with the switch trigger, a contacting end, corresponding to a contacting point of the micro switch, an elastic component, abutting between the switch trigger and the inner wall of the housing, a locking trigger, slidably connected with the housing, sliding along an axis of the connecting shaft, and configured to lock the switch trigger, and a control panel, located in the housing and on a side away from the working assembly, electrically connected with the micro switch and the motor, and controlling the start and stop of the motor.

10. The power tool according to claim 7, wherein an end of the housing away from the working assembly is provided with a power port, and the power port is connected with a power supply device through a power cable.

11. The power tool according to claim 10, wherein the power supply device comprises:

a bag body;

a backpack, connected with the bag body and configured to wear and carry the bag body for the user;

a power supply unit, arranged inside the bag body; and the power cable, electrically connected with the power supply unit and extending outside the bag body, at least part of the power cable being a retractable power cable; the power cable being capable of extending from two sides of the bag body to supply power to an outside.

12. The power tool according to claim 11, wherein two opposite sides of the bag body are provided with a through hole for the power cable to pass through.

13. The power tool according to claim 11, wherein the backpack comprises:

a backpack strap, connected with an upper end of the bag body, and connected by a buckle; and a backpack belt, connected with a lower end of the bag body and connected by the buckle.

14. The power tool according to claim 13, wherein the backpack strap comprises a left backpack strap and a right backpack strap, and the left backpack strap and the right backpack strap are respectively connected with two sides of a top of the bag body.

15. The power tool according to claim 14, wherein both the left backpack strap and the right backpack strap are horizontally connected with a fixing strap, and the two fixing straps are connected by the buckle.

16. The power tool according to claim 11, wherein the power supply unit comprises:

a battery pack; and a mounting base, arranged in the bag body and configured to detachably mount the battery pack.

17. The power tool according to claim 11, wherein a signal line is arranged passed through the power cable.

18. The power tool according to claim 17, wherein the power cable comprises a joint end, and is electrically connected with the power port through the joint end.

* * * * *